US009857520B2

(12) United States Patent
Parker et al.

(10) Patent No.: US 9,857,520 B2
(45) Date of Patent: Jan. 2, 2018

(54) LIGHTING ASSEMBLY

(71) Applicant: Rambus Delaware LLC, Brecksville, OH (US)

(72) Inventors: Jeffery R Parker, Pleasanton, CA (US); Timothy A McCollum, Avon Lake, OH (US); Martin E Ligas, Wadsworth, OH (US); Joseph Crookston, Fairlawn, OH (US); Fumitomo Hide, San Jose, CA (US); Alexey Titov, Portage, MI (US); Ian Hardcastle, Santa Cruz, CA (US)

(73) Assignee: Rambus Delaware LLC, Brecksville, OH (US)

( * ) Notice: Subject to any disclaimer, the term of this patent is extended or adjusted under 35 U.S.C. 154(b) by 434 days.

(21) Appl. No.: 14/499,325

(22) Filed: Sep. 29, 2014

(65) Prior Publication Data

US 2015/0016143 A1    Jan. 15, 2015

Related U.S. Application Data

(62) Division of application No. 13/440,197, filed on Apr. 5, 2012, now Pat. No. 8,864,360.

(Continued)

(51) Int. Cl.
*F21V 7/04* (2006.01)
*F21V 8/00* (2006.01)
(Continued)

(52) U.S. Cl.
CPC ............. *G02B 6/0031* (2013.01); *F21K 9/00* (2013.01); *F21V 7/00* (2013.01); *F21V 29/004* (2013.01);
(Continued)

(58) Field of Classification Search
CPC ....... F21V 14/02; F21V 29/70; G02B 6/0033; G02B 6/0091; G02B 6/0081; G02B 6/0085; G02B 6/0066; G02B 6/0031; F21K 9/61
(Continued)

(56) References Cited

U.S. PATENT DOCUMENTS 5,262,928 A    11/1993  Kashima et al.
5,896,119 A    4/1999   Evanicky et al.
(Continued)

FOREIGN PATENT DOCUMENTS

WO    2010140103    12/2010

OTHER PUBLICATIONS

International Preliminary Report on Patentability for related International Application No. PCT/US2012/032401 dated Nov. 21, 2013. 8 pages.

(Continued)

*Primary Examiner* — Peggy Neils
*Assistant Examiner* — William N Harris
(74) *Attorney, Agent, or Firm* — Renner, Otto, Boisselle & Sklar, LLP

(57) ABSTRACT

A lighting assembly includes a light guide having opposed major surfaces between which light propagates by total internal reflection and a light input edge. The light assembly also includes a light engine. The light engine has a heat conductive armature having a receptacle for a portion of the light guide that includes the light input edge and a light source retained by and thermally coupled to the armature. The armature functions as a heat sink for dissipating heat generated by the light source. The light guide is mechanically retained in the receptacle, and the light guide and the armature cooperate to align the light input edge with the (Continued)

light source for inputting light from the light source into the light guide through the light input edge.

15 Claims, 26 Drawing Sheets

Related U.S. Application Data

(60) Provisional application No. 61/483,431, filed on May 6, 2011.

(51) Int. Cl.
| | |
|---|---|
| *F21K 9/00* | (2016.01) |
| *F21V 7/00* | (2006.01) |
| *F21V 29/70* | (2015.01) |
| *F21V 29/00* | (2015.01) |
| *F21Y 115/10* | (2016.01) |
| *F21V 29/76* | (2015.01) |
| *F21V 29/80* | (2015.01) |

(52) U.S. Cl.
CPC ............ *F21V 29/70* (2015.01); *F21V 29/76* (2015.01); *F21V 29/80* (2015.01); *F21V 2200/20* (2015.01); *F21Y 2115/10* (2016.08)

(58) Field of Classification Search
USPC ... 362/232, 610, 249.03, 285, 372, 418, 449
See application file for complete search history.

(56) References Cited

U.S. PATENT DOCUMENTS

| | | | | |
|---|---|---|---|---|
| 6,219,116 | B1 | 4/2001 | Yuuki et al. | |
| 6,305,109 | B1 * | 10/2001 | Lee | G02B 6/0068 40/546 |
| 6,481,130 | B1 * | 11/2002 | Wu | F21V 13/04 362/297 |
| 7,665,865 | B1 | 2/2010 | Hulse et al. | |
| 7,800,711 | B2 | 9/2010 | Kim | |
| 7,810,262 | B2 * | 10/2010 | Sadon | G09F 9/33 40/490 |
| 8,016,451 | B2 * | 9/2011 | Householder | F21L 4/027 362/188 |
| 8,864,360 | B2 | 10/2014 | Parker et al. | |
| 2008/0080167 | A1 | 4/2008 | Chang et al. | |
| 2008/0284308 | A1 | 11/2008 | Pang | |
| 2009/0034293 | A1 | 2/2009 | Parker | |
| 2010/0033948 | A1 | 2/2010 | Harbers et al. | |
| 2010/0067231 | A1 | 3/2010 | Simon et al. | |
| 2010/0149802 | A1 | 6/2010 | Chang | |
| 2010/0214777 | A1 | 8/2010 | Suehiro et al. | |
| 2011/0026260 | A1 | 2/2011 | Ko | |
| 2011/0032708 | A1 | 2/2011 | Johnston et al. | |
| 2011/0234076 | A1 | 9/2011 | Simon et al. | |
| 2012/0069595 | A1 * | 3/2012 | Catalano | F21K 9/52 362/555 |
| 2013/0329459 | A1 * | 12/2013 | Fisher | F21S 8/036 362/609 |

OTHER PUBLICATIONS

PCT International Search Report and Written Opinion of the International Searching Authority for related International Application No. PCT/US2012/032401 dated Jan. 23, 2013. 15 pages.

* cited by examiner

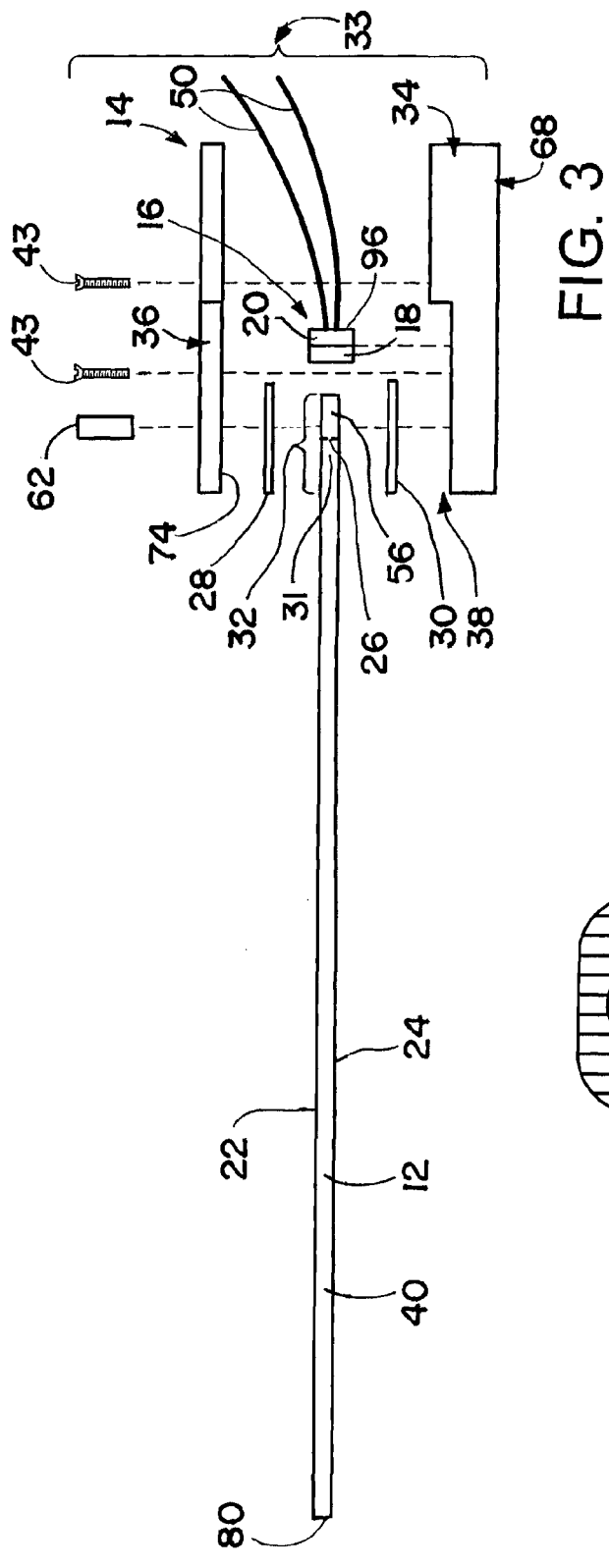
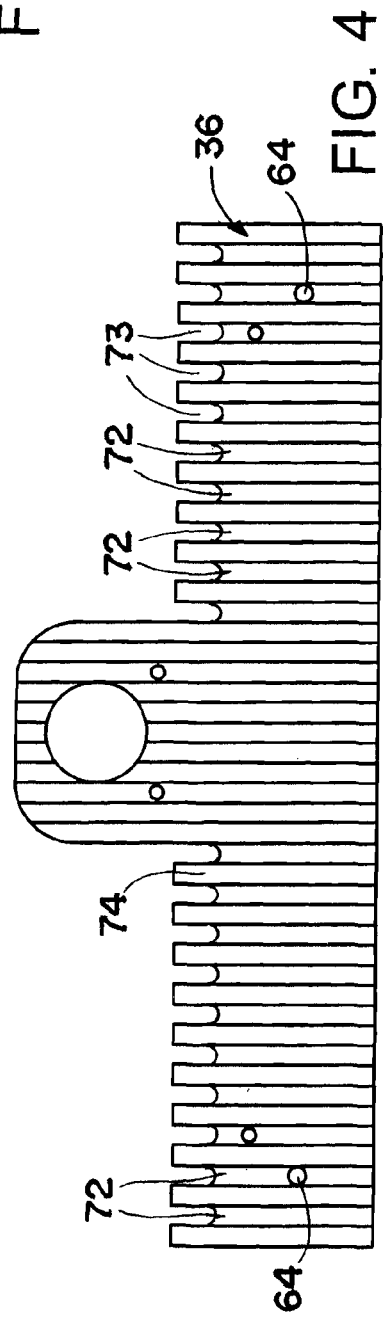

LIGHTING ASSEMBLY

RELATED APPLICATION DATA

This application is a divisional application of U.S. patent application Ser. No. 13/440,197, filed Apr. 5, 2012, which claims the benefit of U.S. Provisional Patent Application No. 61/483,431, filed May 6, 2011, the disclosures of which are incorporated herein by reference in their entireties.

BACKGROUND

Energy efficiency has become an area of interest for energy consuming devices. One class of energy consuming devices is lighting devices. Solid-state light sources, such as light emitting diodes (LEDs), show promise as energy efficient light sources for lighting devices. But there remains room for improvement in how to output light from lighting devices that employ solid-state light sources.

BRIEF DESCRIPTION OF THE DRAWINGS

FIG. 3 is an exploded schematic side view of the lighting assembly of FIG. 1;

FIG. 4 is a schematic view of an inner surface of the cover for the light engine for the lighting assembly of FIG. 1;

DETAILED DESCRIPTION

Figure 1:
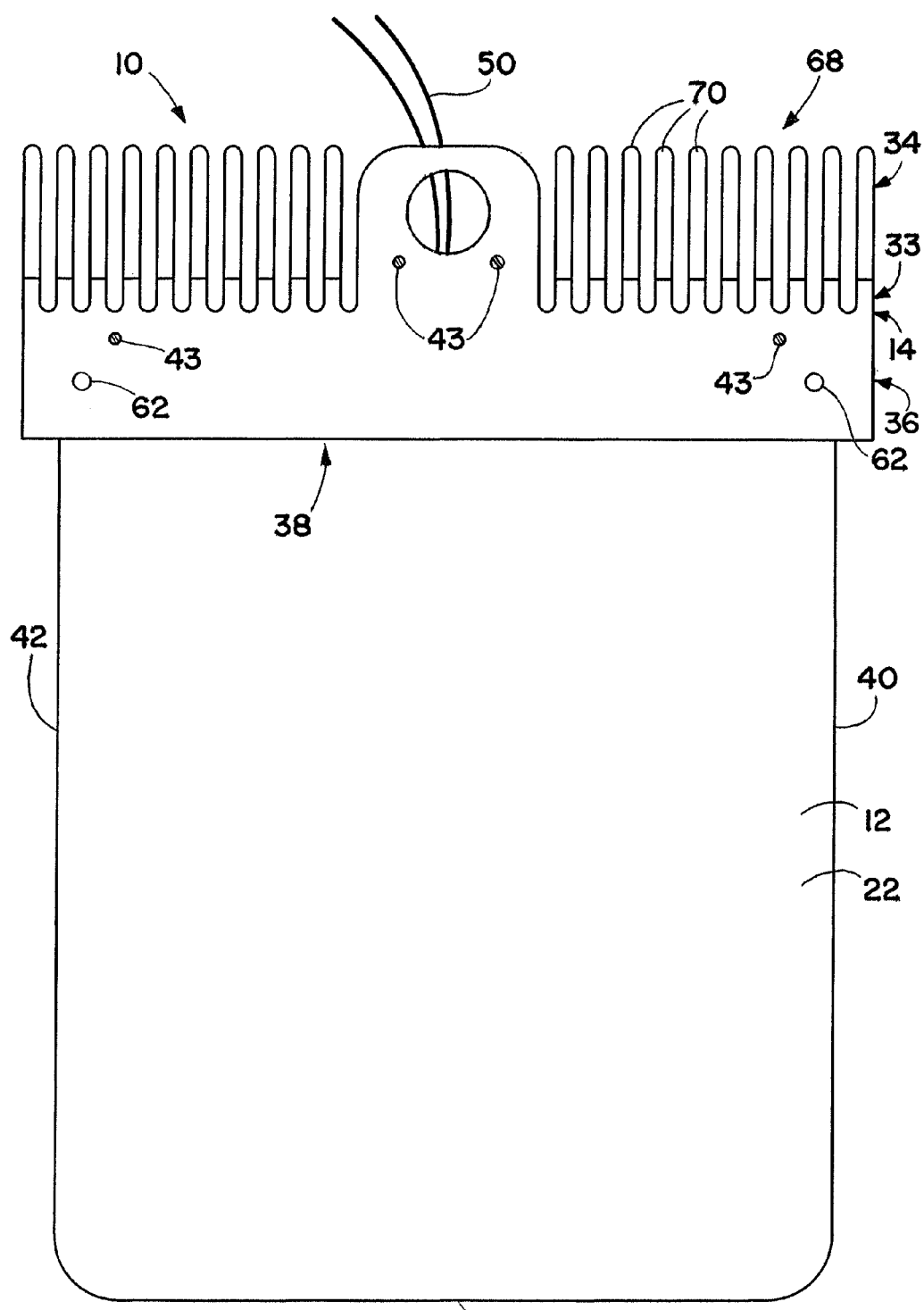
FIG. 1 is a schematic view of an exemplary lighting assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments.

Aspects of this disclosure relate to a lighting assembly. For instance, as described in greater detail below, the lighting assembly includes a light guide having opposed major surfaces between which light propagates by total internal reflection and a light input edge. The light assembly also includes a light engine. The light engine has a heat conductive armature having a receptacle for a portion of the light guide that includes the light input edge and a light source retained by and thermally coupled to the armature. The armature functions as a heat sink for dissipating heat generated by the light source. The light guide is mechanically retained in the receptacle, and the light guide and the armature cooperate to align the light input edge with the light source for inputting light from the light source into the light guide through the light input edge.

With initial reference to FIGS. 1-4, an exemplary embodiment of the lighting assembly 10 is shown. The lighting assembly 10 includes a light guide 12 and a light engine 14. The light engine 14 includes a light source assembly 16. The light source assembly 16 includes one or more light sources 18. Each light source 18 is typically embodied as one or more solid-state devices. In one embodiment, the light sources 18 are mounted to a printed circuit board (PCB) 20. The printed circuit board 20 is thermally conductive to conduct heat that is generated by the light sources 18. Furthermore, the printed circuit board 20 may be regarded as a coupling member located between the light sources 18 and a mounting unit (discussed in greater detail below) of the light engine 14.

Exemplary light sources 18 include solid-state devices such as LEDs, laser diodes, and organic LEDs (OLEDs). In an embodiment where the light source 18 is one or more LEDs, the LEDs may be top-fire LEDs or side-fire LEDs, and may be broad spectrum LEDs (e.g., emit white light) or LEDs that emit light of a desired color or spectrum (e.g., red light, green light, blue light, or ultraviolet light). In one embodiment, the light source 18 emits light with no operably-effective intensity at wavelengths greater than 500 nanometers (nm) (i.e., the light source 18 emits light at wavelengths that are predominantly less than 500 nm). The light source assembly 16 may additionally include: circuitry, power supply and/or electronics for controlling and driving the light sources 18, a heat sink, and any other appropriate components.

Light from the light sources 18 is input into the light guide 12. The light guide 12 is a solid article made from, for example, acrylic, polycarbonate, glass, or another appropriate material. The light guide 12 also may be a multi-layer light guide having two or more layers. The light guide 12 has opposed major surfaces 22 and 24. Depending on the configuration of the light guide 12, the light guide has at least one edge. For instance, in a case where the light guide 12 is a dome (not illustrated), the light guide has one edge. In a case where the light guide 12 is shaped like a disk (e.g., FIG. 13), a hollow cylinder (not illustrated), is frustroconical (not illustrated), is a frustrated pyramid (not illustrated), is a dome (not illustrated) with a hole at the dome's apex, or another similar shape, the light guide 12 has two opposed edges. Other light guide 12 shapes are possible, such as a globe or a shape approximating the bulbous shape of a conventional incandescent bulb. In one embodiment, a light bulb configuration or a lighting fixture configuration may be established using planar or curved light guides 12 that are arranged in a three-dimensional geometric (e.g., polygonal) configuration.

In the case where the light guide 12 is basically rectangular (e.g., FIGS. 1-3), the light guide 12 has four edges. Other geometries for the light guide 12 result in a corresponding number of edges. Depending on the geometry of the light guide 12, each edge may be straight or curved, and adjacent edges may meet at a vertex or join in a curve.

Figure 2:
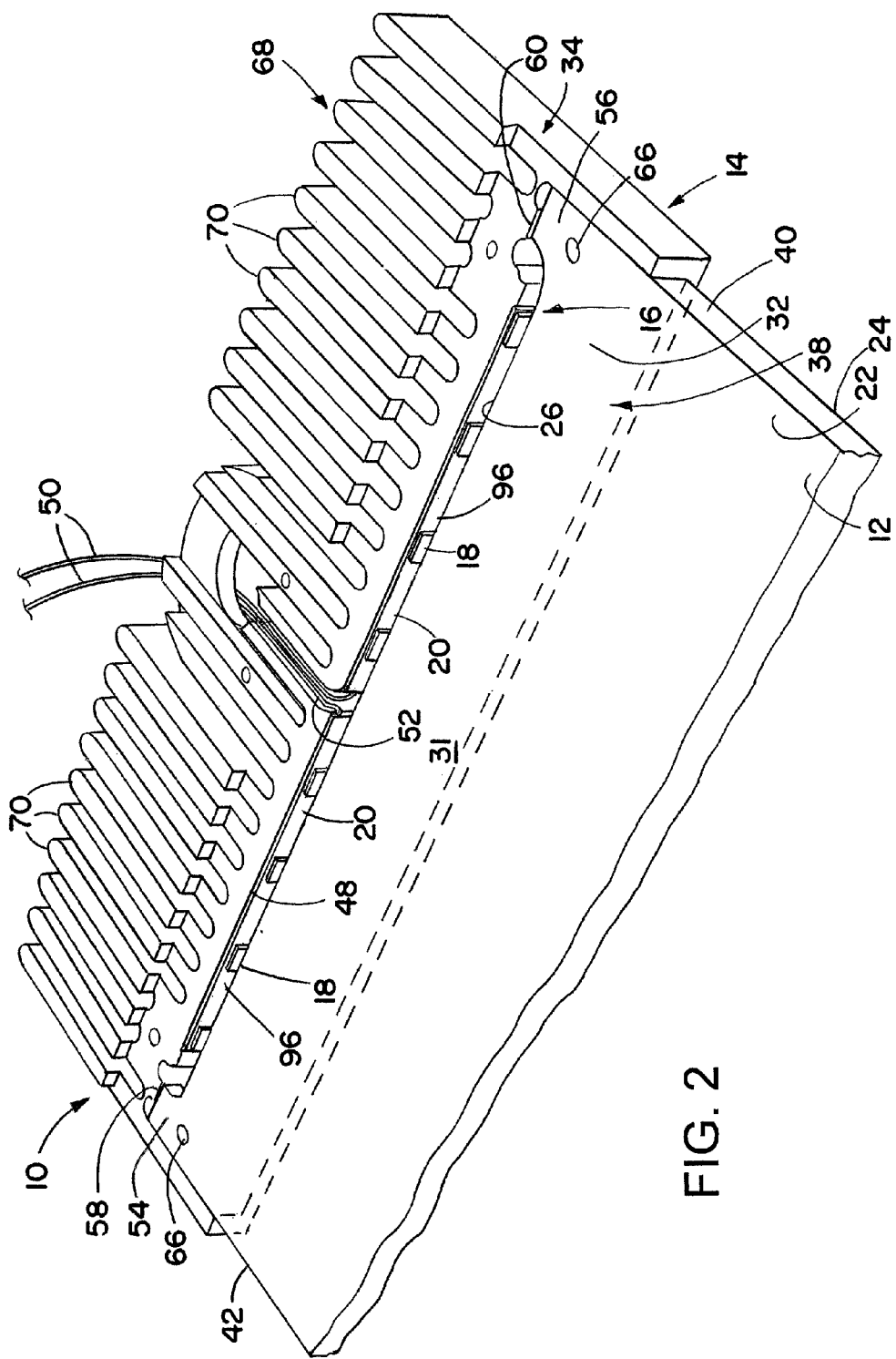
FIG. 2 is a schematic view of a light engine for the lighting assembly of FIG. 1 with a cover removed and a light guide shown partially cut away.
Figure 5:
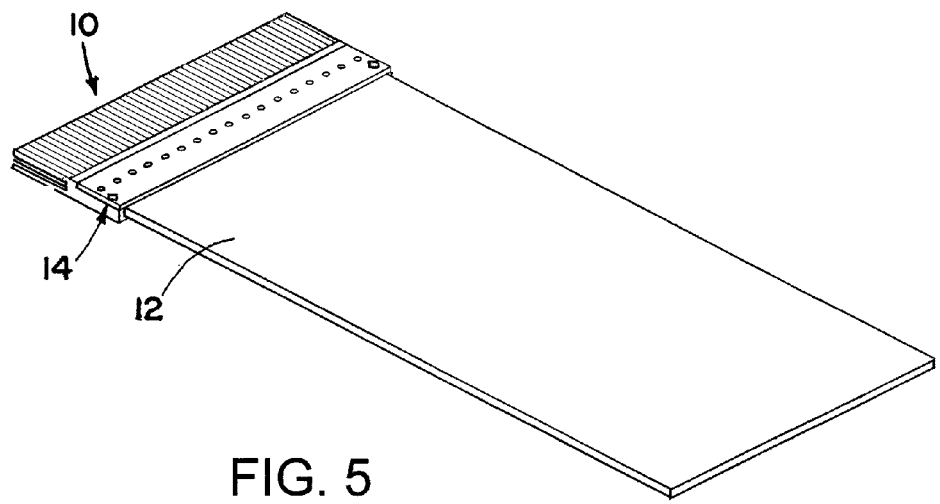
FIG. 5 is a schematic view of another exemplary lighting assembly.
Figure 6:
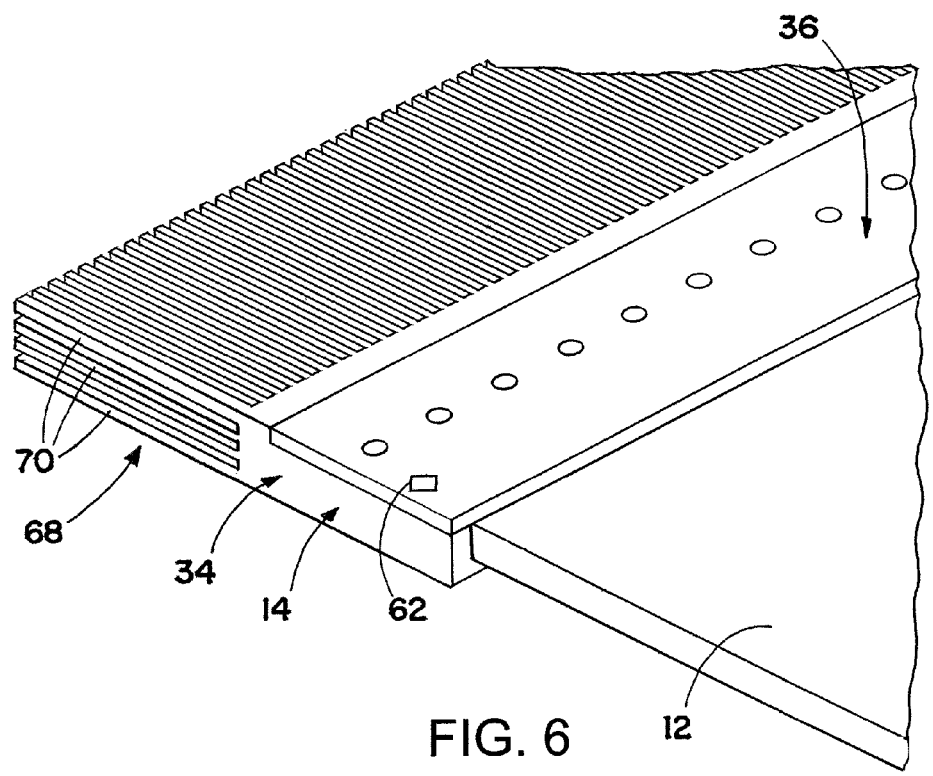
FIG. 6 is a schematic view of a portion of the exemplary lighting assembly of FIG. 5.

One of the light guide edges serves as a light input edge 26. In some embodiments, the light input edge 26 is an external edge of the light guide 12 (e.g., as best shown in FIG. 2). In another embodiment, the light input edge 26 is an internal edge of the light guide 12, which is an edge completely surrounded by the light guide 12 and is usually an edge of a hole that extends between the major surfaces 22, 24 of the light guide (e.g., as shown in FIGS. 13-22). Light output from the light source 18 is directed toward the light input edge 26. Additional optical elements (e.g., lenses, reflectors, etc.) may be present to assist in inputting the light into the light guide 12.

In one embodiment, a first reflector 28 is located adjacent the major surface 22 side of the light guide 12 and adjacent each of the light source 18 and the light input edge 26. A second reflector 30 is located adjacent the major surface 24 side of the light guide 12 and adjacent each of the light source 18 and the light input edge 26. The reflectors 28, 30, as shown in the illustrated embodiment, are reflective films disposed between an armature of the light engine 14 (the armature is described in greater detail below) and a received portion 32 of the light guide 12 that is received in the light engine 14. In another embodiment, the reflectors 28, 30 are respective reflective surfaces of the armature or other structural members of the light engine 14. In one embodiment, the received portion 32 includes the light input edge 26 and at least part of the light transition region 31 of the light guide 12. The light transition region 31 is located between the light input edge 26 and light-extracting elements (described below) at at least one of the major surfaces 22, 24.

Once input into the light guide 12, the light propagates through the light guide 12 by total internal reflection (TIR) at the opposed major surfaces 22, 24. For purposes of this disclosure, any light input surface of the light guide 12 is considered a light input edge, even if it is located on one of the major surfaces 22, 24 or forms part of a light turning and/or homogenizing structure of the light guide 12 to introduce light between the major surfaces 22, 24 in a manner that allows the light to propagate along the light guide 12 by total internal reflection at the major surfaces 22, 24.

Length and width dimensions of each of the major surfaces 22, 24 are much greater than, typically ten or more times greater than, the thickness of the light guide 12. For instance, in the rectangular embodiment shown in FIGS. 1 and 2, the length (measured from the light input edge 26 to an opposite edge distal the light input edge 26) and the width (measured along the light input edge 26) of the light guide 12 are both much greater than the thickness of the light guide 12. The thickness is the dimension of the light guide 12 in a direction orthogonal to the major surfaces. The thickness of the light guide 12 may be, for example, about 0.1 millimeters (mm) to about 10 mm. The light guide 12 may be rigid or flexible.

The light guide 12 includes light-extracting elements in or on at least one of the major surfaces 22, 24. Light-extracting elements that are in or on a major surface 22, 24 will be referred to as being "at" the major surface 22, 24. Each light-extracting element functions to disrupt the total internal reflection of the propagating light that is incident on the light-extracting element. In one embodiment, the light-extracting elements reflect light toward the opposed major surface so that the light exits the light guide 12 through the opposed major surface. Alternatively, the light-extracting elements transmit light through the light-extracting elements and out of the major surface 22, 24 of the light guide 12 having the light-extracting elements. In another embodiment, both of these types of light-extracting elements are present. In yet another embodiment, the light-extracting elements reflect some of the light and refract the remainder of the light incident thereon. Therefore, the light-extracting elements are configured to extract light from one or both of the major surfaces 22, 24. The light-extracting elements may be arranged to output light over part or all of one or both of the major surfaces 22, 24.

The light-extracting elements may be at one or both of the major surfaces 22, 24 through which light is emitted, or at the opposite major surface 22, 24. Light guides having such light-extracting elements are typically formed by a process such as stamping, molding, embossing, extruding, laser etching, chemical etching, or another suitable process. Light-extracting elements may also be produced by depositing curable material on the light guide 12 and curing the deposited material using heat, UV-light or other radiation. The curable material can be deposited by a process such as printing, ink jet printing, screen printing, or another suitable process. Alternatively, the light-extracting elements may be inside the light guide between the major surfaces 22, 24 (e.g., the light-extracting elements may be light redirecting particles and/or voids disposed in the light guide).

The light-extracting elements are configured to extract light in a defined intensity profile, such as a uniform intensity profile, over the relevant major surface 22, 24 and/or to extract light in a defined light ray angle distribution. Using variations in the light-extracting elements, the major surfaces 22, 24, or portions thereof, can have different intensity profiles and/or light ray angle distributions. Intensity profile refers to the variation of intensity with position within a light-emitting region (such as the area of the major surface 22, 24 from which light is emitted). Light ray angle distribution refers to the variation of intensity with ray angle (typically a solid angle) of light emitted from a light-emitting region (such as the area of the major surface 22, 24 from which light is emitted).

Exemplary light-extracting elements include light-scattering elements, which are typically features of indistinct shape or surface texture, such as printed features, ink jet printed features, selectively-deposited features, chemically etched features, laser etched features, and so forth. Other exemplary light-extracting elements include features of well-defined shape, such as V-grooves, lenticular grooves, and features of well-defined shape that are small relative to the linear dimensions of the major surfaces 22, 24, which are referred to herein as micro-optical elements. The smaller of the length and width of a micro-optical element is less than one-tenth of the larger of the length and width of the light guide 12, and the larger of the length and width of the micro-optical element is less than one-half of the smaller of the length and width of the light guide 12. The length and width of the micro-optical element are measured in a plane parallel to the major surface 22, 24 of the light guide 12 for flat light guides 12 or along a surface contour for non-flat light guides 12.

Micro-optical elements are shaped to predictably reflect light or predictably refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, will not be described in detail in this disclosure. The micro-optical elements may vary in one or more of size, shape, depth or height, density, orientation, slope angle, or index of refraction such that a desired light output from the light guide 12 is achieved over the corresponding major surface 22, 24.

As indicated, the lighting assembly 10 includes a light engine 14. The light engine 14 functions to retain the light guide 12 and to retain, as part of the light engine, the light source 18. In addition, the light engine 14 aligns the light input edge 26 with the light source 18 in an arrangement for inputting light from the light source 18 into the light input edge 26. Additionally, the light engine 14 dissipates heat that is generated by the light source 18.

As will be described in greater detail below, the light engine 14 includes an armature 33. In one embodiment, the armature 33 mechanically supports the light guide 12. In embodiments where the lighting assembly 10 is mounted so that the light guide 12 has a horizontal component, the light guide 12 is cantilevered from the armature 33. For instance, the armature 33 may be coupled to an architectural surface (e.g., a wall or a ceiling) by one or more of a coupling member, such as a pole, a rod, one or more wires or cables (e.g., "aircraft cable"), electrical wire that supplies electricity to the lighting assembly 10, screws, etc. In other embodiments, the lighting assembly 10 may be embodied as a floor lamp, a table lamp, a task light, or other lighting device.

The light engine 14 of the embodiment of FIGS. 1-4 will now be described in detail. In this embodiment, the light engine 14 includes the armature 33 (FIG. 1). In some embodiments, the armature 33 is a monolithic component made of metal, such as aluminum, or other rigid and thermally conductive material. The armature 33 serves as the primary framework for the lighting assembly 10. In the illustrated embodiment, the armature 33 includes a mounting unit 34 and a cover 36, each of which is a monolithic component made of metal, such as aluminum, or other rigid and thermally conductive material.

An example of the light engine 14 in which the armature 33 includes the mounting unit 34 and the cover 36 will now be described. In alternative examples where the light engine 14 includes a monolithic armature 33, the monolithic armature 33 has elements and features that are similar to or the same as those elements and features that are described below with respect to the mounting unit 34 and the cover 36. One possible difference is that in the monolithic embodiment, the received portion 32 of the light guide 12 is slid into a receptacle 38 of the armature 33, whereas in a multipart construction for the armature 33, the received portion 32 of the light guide 12 may be slid into or placed in the receptacle 38 and then the cover 36 may be installed.

As indicated, the light engine 14 includes a receptacle 38 that receives the received portion 32 of the light guide 12. The received portion 32 includes the light input surface 26 and typically at least part of the light transition region 31 so that all or part of the light transition region 31 is disposed in the armature 33. In the illustrated embodiment, the receptacle 38 is defined by a recess in the mounting unit 34. The recess has a height that is the same as or greater than the thickness of the light guide 12 and the recess has a width that is the same as or greater than the width of the light guide 12 so that the light guide 12 fits in the recess. In some embodiments, the mounting unit 34 directly contacts the light guide 12 and, in other embodiments, the reflector 30 is located between the light guide 12 and the mounting unit 34. The cover 36 is secured to the mounting unit 34 to complete the receptacle 38. In either case, a portion of the mounting unit 34 mechanically supports the light guide 12. A portion of the cover 36 connects to the mounting unit 34 and is secured thereto, such as with threaded fasteners 43. Alternatively, the cover 36 may be secured to mounting unit 34 with pins, adhesive, welds, clips, rivets, or another appropriate mechanism. In some embodiments, the cover 36 directly contacts the light guide 12 and, in other embodiments, the reflector 28 is located between the light guide 12 and the cover 36. In either case, a portion of the cover 36 mechanically supports the light guide 12. In the case where the armature 33 has a monolithic structure, the receptacle 38 may be defined by a slot in the armature 33.

The light engine 14 includes the light source assembly 16 located in and aligned with the receptacle 38. The light source assembly 16 of the illustrated embodiment includes two light source segments 96 each of which includes multiple light sources 18 in the form of LEDs and the printed circuit board 20 on which the light sources are mounted. A back wall 48 of the receptacle 38 provides one or more planar surfaces against which the light source segments 96 are mounted (e.g., with screws, thermally conductive adhesive or another suitable fastener). Electrical conductors 50 that supply electricity to the light source segments 96 pass through a channel 52 in the mounting unit 34. The light source segments 96 may be controlled so that all light source segments 96 are either on or off, or each light source segment 96 may be independently controlled.

The distance between the light input edge 26 of the light guide 12 and the light sources 18 is defined. The distance may be zero (e.g., where the light input edge 26 and the light sources 18 touch). The distance is defined by a mechanical interaction between the light guide 12 and the light engine 14. In the illustrated embodiment, the light input edge 26 includes spacing protrusions 54, 56 that respectively contact the back wall 48 of the receptacle 38 when the light guide is installed in the receptacle. Contact is made at respective contact points 58, 60 on the back wall 48. In a direction normal to the light input edge 26, the contact points 58, 60 may be offset from the light output surfaces of the LEDs. This offset, if any, and the length of the protrusions 54, 56 measured from the light input edge 26 in the direction normal to the light input edge 26, are selected to define the desired distance between the light input edge 26 and the light sources 18. In other embodiments, the protrusions 54, 56 of the light guide 12 are omitted. In this case, the light input edge 26 abuts the contact points 58, 60 of the mounting unit 34, or other spacing elements, to define the distance between the light input edge 26 and the light sources 18. In still other embodiments, the distance is defined in other ways. For instance, in one embodiment, securing members 62 are used to retain the light guide 12 in the receptacle 38 and/or cooperate with the light guide 12 to align the light input edge 26 of the light guide 12 relative to the light sources 18 such that the distance between the light input edge 26 and the light sources 18 is defined.

In the illustrated embodiment, the securing members 62 are pins that traverse holes 64 in the cover 36 and holes 66 in the light guide 12. The pins also may traverse holes in the mounting unit 34. The pins may be retained by friction. Alternatively, the pins may be integral with one of the mounting unit 34 and the cover 36. Other types of securing members 62 are possible, and may be in the form of permanent fasteners (e.g., adhesive) or in the form of reusable fasteners (e.g., most mechanical fasteners). Alternative securing members 62 include, but are not limited to, threaded fasteners, clips, rivets, detent or indents on one of the mounting unit 34 and/or the cover 36 that coordinate with indents or detents on the light guide 12, resilient fingers, adhesive, etc. In another embodiment, the securing members 62 are omitted and the light guide 12 is retained by friction, which may be enhanced by a clamping force applied to the light guide 12 by the mounting unit 34 and the cover 36. In one embodiment, the light guide 12 is configured to be removable by a user of the lighting assembly 10 so that the light engine 14 can be replaced (e.g., the light guide 12 is reused) or the light guide 12 can be replaced (e.g., the light engine 14 is reused with a different light guide 12). In the embodiments of FIGS. 1-4, at least one of the receptacle 38 and the securing members 62 are configured to align the light input edge 26 with the light source assembly 16 in a direction parallel to the light input edge 26 and to the major surfaces 22, 24.

In one embodiment, index matching material (not illustrated) is present between the light sources 18 and the light input edge 26 of the light guide 12.

As indicated, the armature 33 dissipates heat that is generated by the light sources 18. The armature 33 is fabricated from one or more thermally-conductive materials, such as aluminum. In addition, the armature 33 is configured to enhance heat dissipation. In the illustrated embodiment, for example, the mounting unit 34 includes a heat sink 68 in the form of spaced-apart cooling fins 70.

Optionally, heat dissipation can be increased by establishing an airflow pathway through the light engine 14 through which air flows by convection due to heating by the light sources 18. In the embodiment of FIGS. 1-4, an air flow pathway is provided by channels 72 in the interior surface 74 of the cover 36. The channels 72 allow air to flow between the light guide 12 and the cover 36. In one embodiment, each channel 72 terminates at a respective opening 73 in or near the space between a pair of fins 70. In this manner, movement of air through openings 73 and the channels 72 enhances heat dissipation. Additional channels may be formed in the mounting unit 34 to allow air to pass between the mounting unit 34 and the light guide 12. In one embodiment, the channels 72 are open to the light sources 18.

In other embodiments, additional thermal management features may be present. For example, an additional heat sink may be connected to the light engine 14. Active cooling elements, such as a fan or a liquid cooling assembly, may be included as part of the light engine 14.

Figure 7:
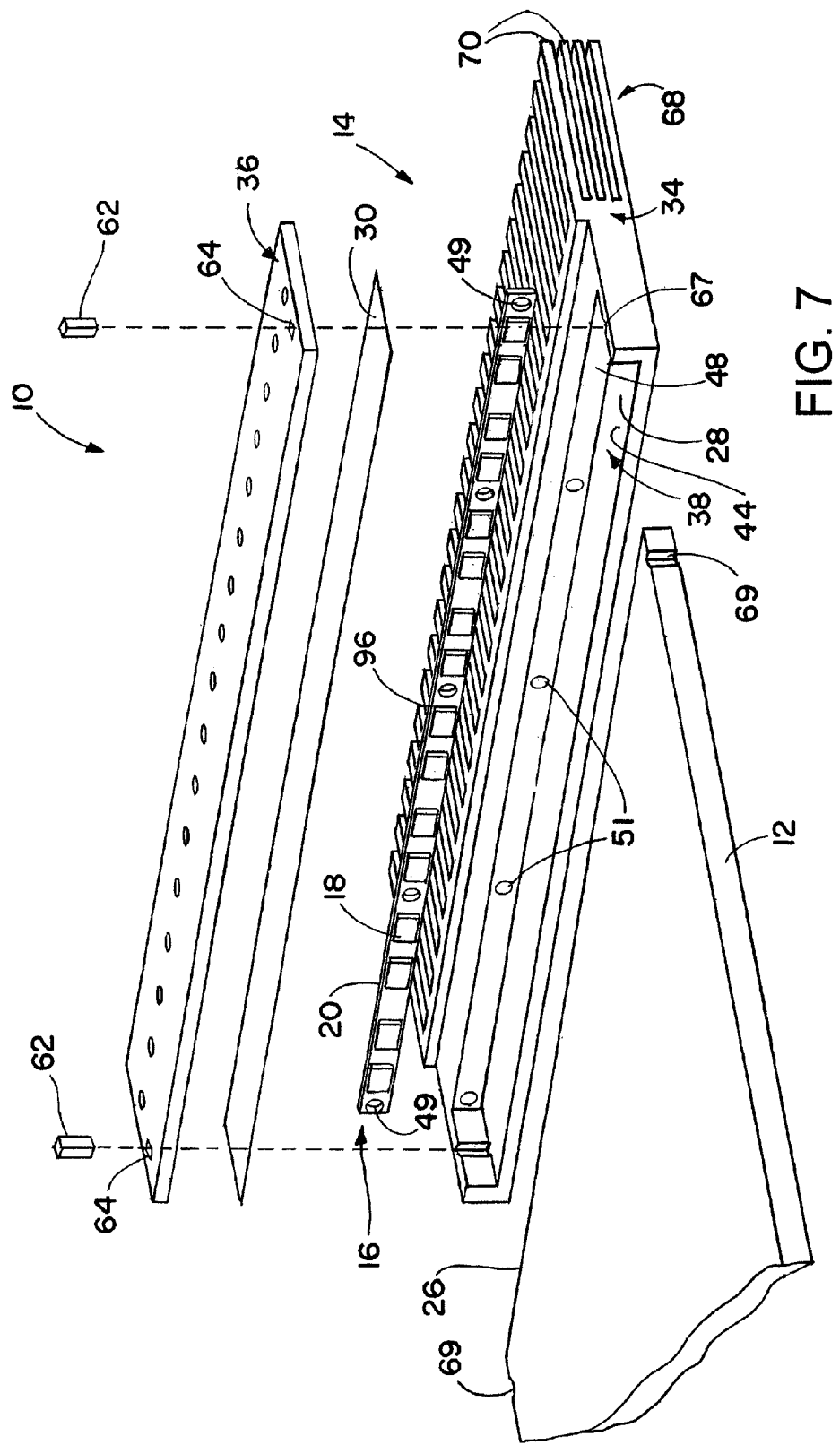
FIGS. 7 and 8 are exploded schematic views of the lighting assembly of FIG. 5 with a light guide shown partially cut away.

With additional reference to FIGS. 5-9, another embodiment of the lighting assembly 10 is illustrated. This embodiment is similar to that of FIGS. 1-4 and, therefore, features that are functionally the same as those of FIGS. 1-4 will not be described. Referring first to FIG. 7, a single light source segment 96 of the light source assembly 16 is attached to the back wall 48 of the receptacle 38. The light source segment 96 is attached with screws (not illustrated) that extend through holes 49 in the printed circuit board 20 and into threaded holes 51 in the back wall 48. Electrical conductors (not illustrated) to supply electricity to the light sources 18 may pass through a hole or channel in the mounting unit 34.

Figure 8:
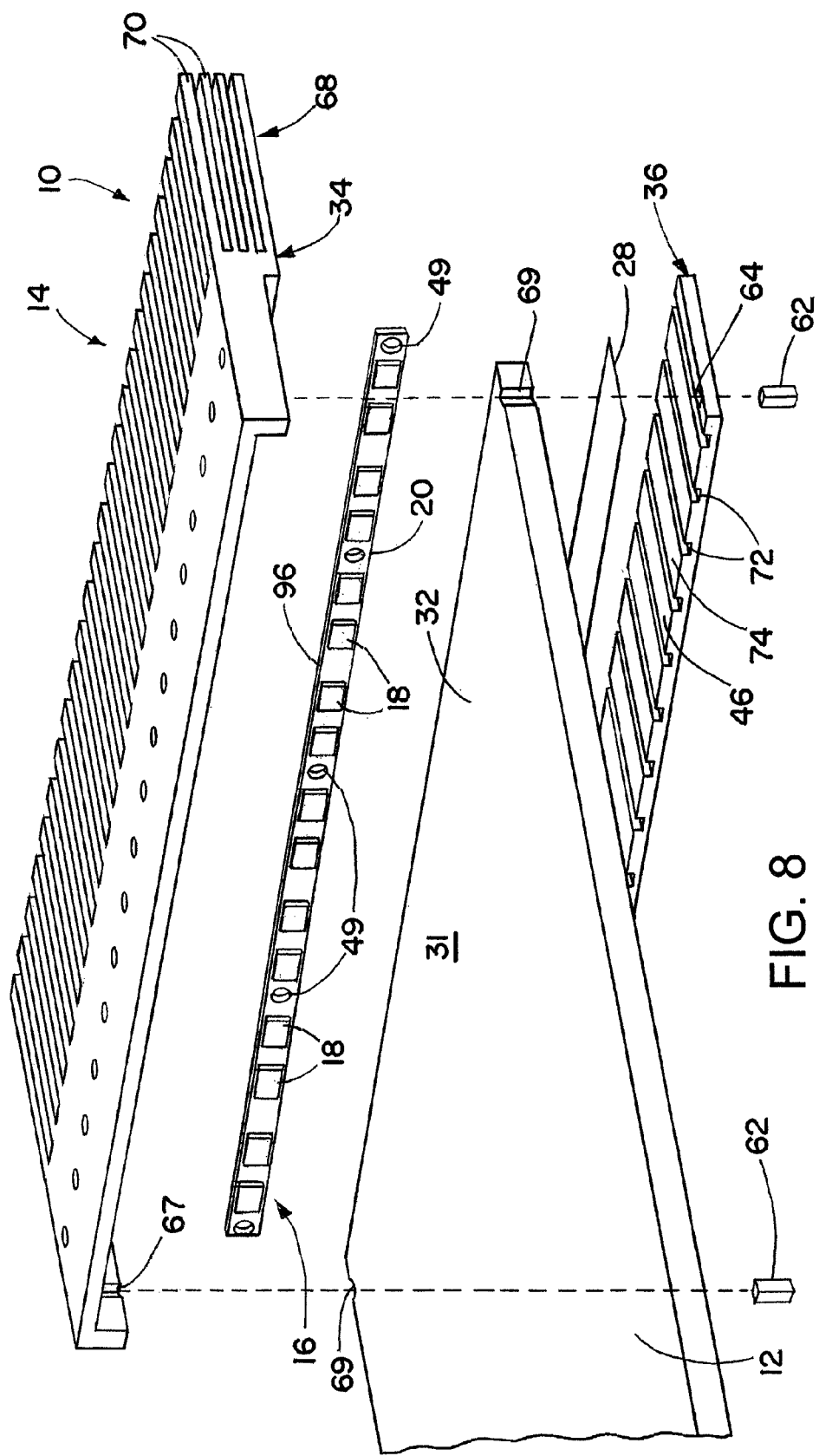

Referring now to FIG. 8, in this embodiment, the distance between the light input edge 26 and the light sources 18 is controlled by securing members 62 that are partially received in recesses 69 of the light guide 12 and partially received in recesses 67 (FIG. 7) of the mounting unit 34. The securing members 62 also serve to mechanically retain the light guide 12 in the light engine 14 and to secure the cover 36 to the mounting unit 34.

Figure 9:
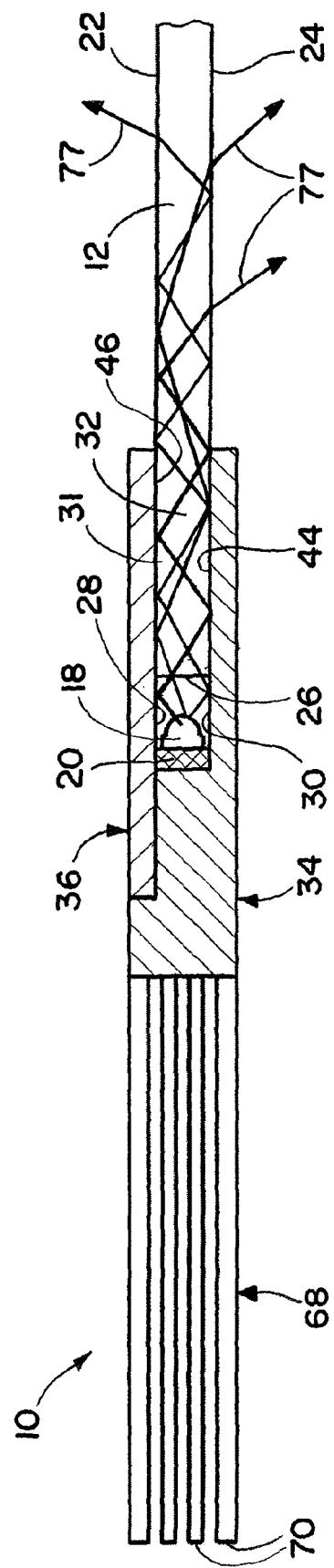
FIG. 9 is a cross-sectional view of the lighting assembly of FIG. 5 with a light guide shown partially cut away.

With reference to the cross-sectional view of FIG. 9, exemplary light rays 77 are shown emanating from the light source 18. The light rays 77 pass through the space (if any) between the light source 18 and the light input edge 26 and enter the light guide 12 through the light input edge 26. Once in the light guide 12, the light rays 77 propagate by total internal refraction until disrupted by a light-extracting element (not shown) and exit the light guide 12 through one of the major surfaces 22, 24. Some of the light rays 77 that would "miss" the light input edge 26 in the absence of the reflectors 28, 30 (FIG. 3) or, as illustrated in the embodiment of FIG. 9, the reflective inner surfaces 44, 46 of the mounting unit 34 and cover 36, are redirected by the reflectors or reflective inner surfaces and become incident on the light input edge 26 within the angular range that will produce total internal reflection of the light within the light guide 12. As a result, the light coupling efficiency between the light sources 18 and the light guide 12 is enhanced.

Figure 10:
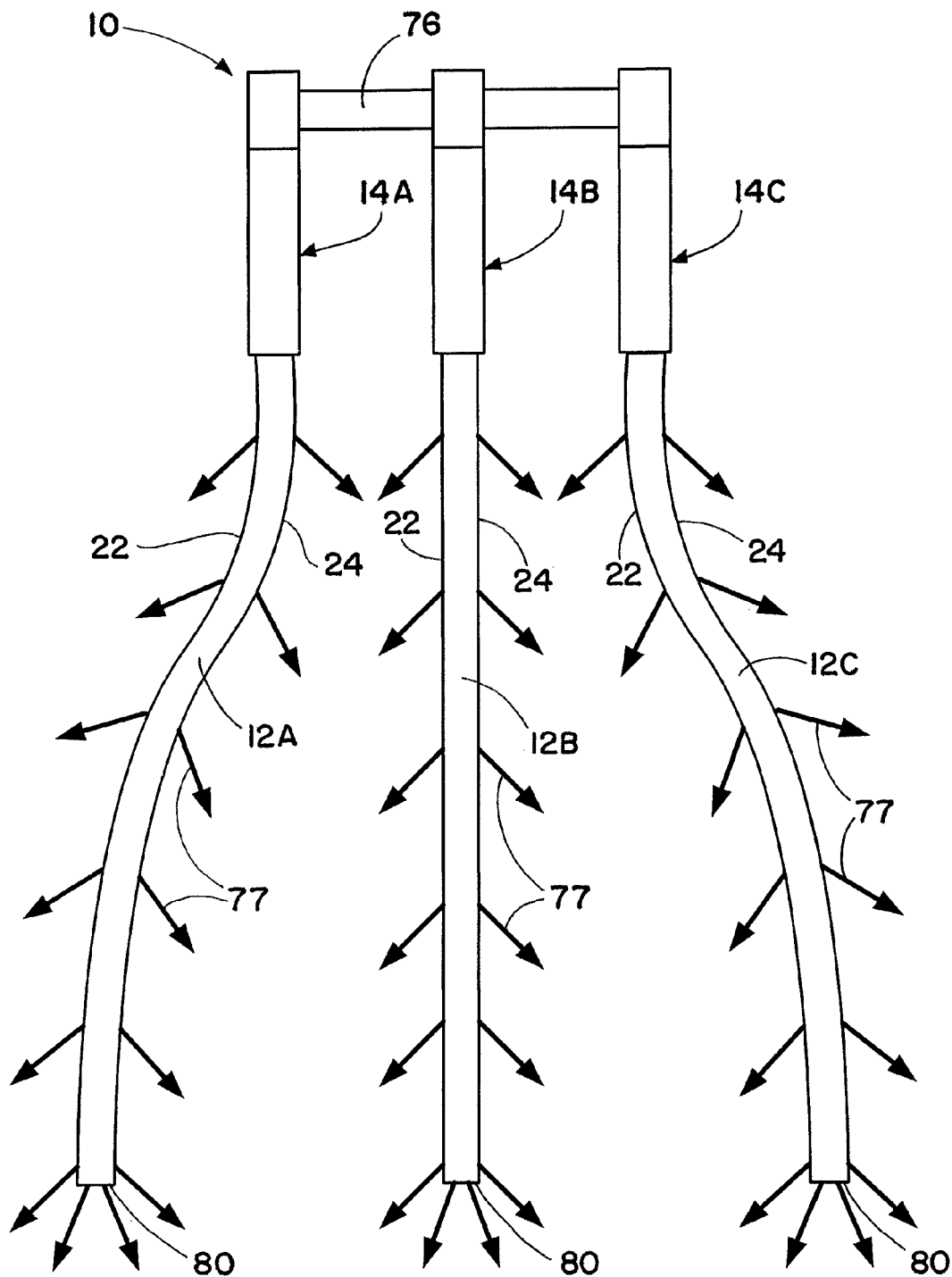
FIG. 10 is a schematic view of another exemplary lighting assembly.

As illustrated in FIG. 10, more than one light engine 14 may be coupled together with a linking structure 76, such as the illustrated rod that interconnects three light engine assemblies. In this embodiment, the light engine assemblies 14A-14C and the respectively retained light guides 12A-12C form the lighting assembly 10. In the illustrated embodiment, the center light guide 12B is planar and spaced apart from the other two light guides 12A and 12C, which are bent for ornamental purposes of the lighting assembly 10. Other configurations are possible. For instance, each of the light guides 12A-12C may be planar and/or may contact one another. When more than one light guide 12 is present, each light guide 12 may be selectively illuminated so that the lighting assembly 10 produces different light output intensities and/or light output with different characteristics. FIG. 10 shows exemplary light output rays for each light guide 12A-12C using arrows 77 extending from both major surfaces 22, 24 of each light guide 12A-12C. In other embodiments, the light-extracting elements are configured to output light through at least part of one of the major surfaces 22, 24. Each of the light guides 12A-12C of the illustrated exemplary embodiment also output light from an edge 80 opposite the light input edge 26 (the light input edge 26 not illustrated in FIG. 10).

Figure 11:
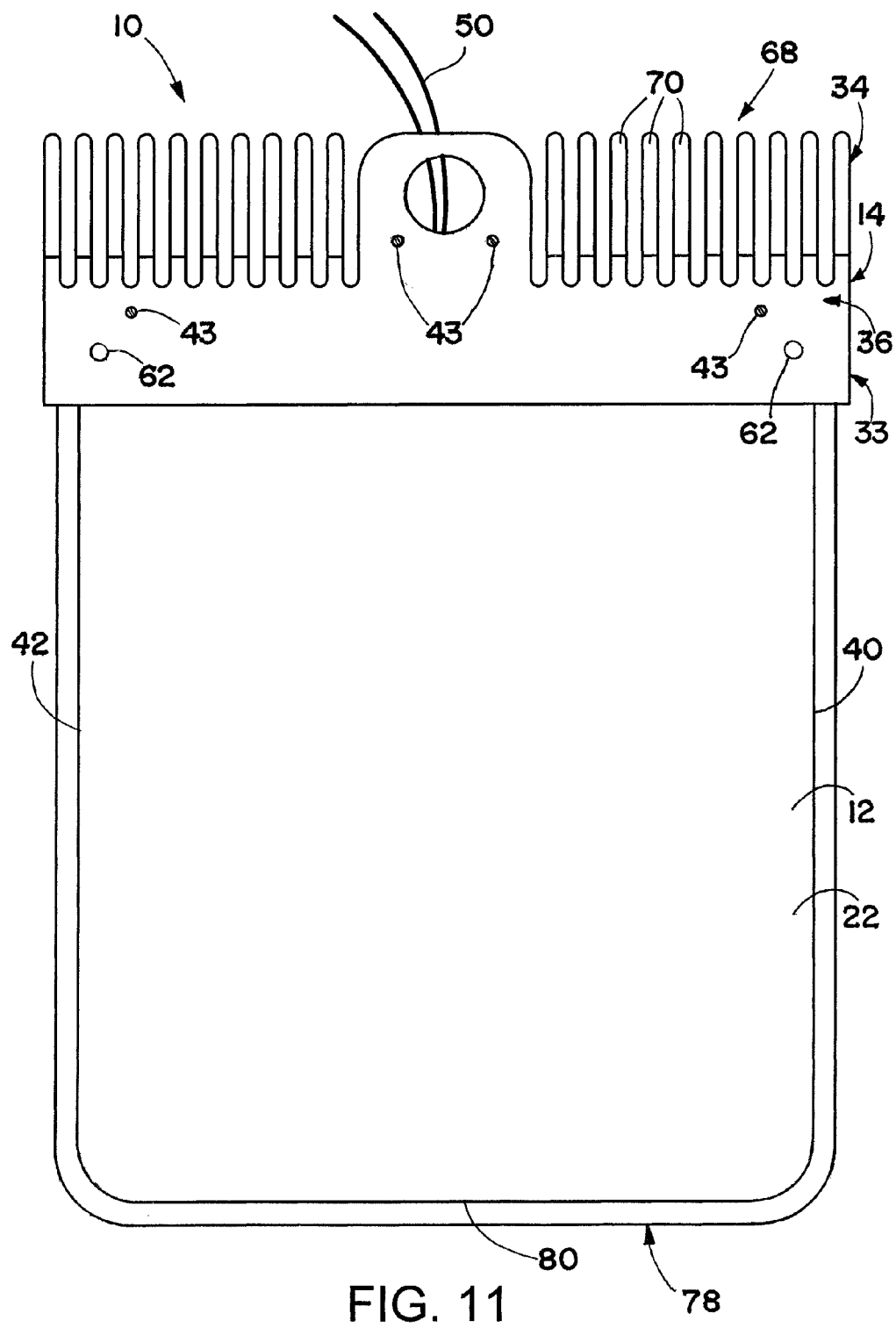
FIG. 11 is a schematic view of another exemplary lighting assembly.

In the embodiment of FIG. 11, a frame 78 at least partially circumscribes the light guide 12. In an example, the frame 78 extends along the side edges 40, 42 of the light guide 12.

In the example shown, the frame 78 extends along the side edges 40, 42 and along the edge 80 opposite the light input edge 26. The frame 78 may connect to the light engine 14. In one embodiment, the frame 78 is integrally formed with the armature 33.

In one embodiment, an inside edge of the frame 78 adjacent the edges 40, 42 of the light guide 12 is reflective to reflect any light exiting the light guide 12 through the edges 40, 42 back into the light guide 12. Alternatively, a reflective film or material is located between the frame 78 and the edges 40, 42. In other embodiments, where the frame 78 is or is not present, the edges 40, 42 are coated with a reflective coating. In still other embodiments, there is no frame or reflective material adjacent the edges 40, 42 and the edges 40, 42 include light redirecting elements at their respective surfaces. Similar arrangements may be made for the edge 80. For example, in one embodiment, an inside edge of the frame 78 adjacent the edge 80 of the light guide 12 is reflective to reflect any light exiting the light guide 12 through the edge 80 back into the light guide 12. Alternatively, a reflective film or material is located between the frame 78 and the edge 80. In other embodiments, where the frame 78 is or is not present along the edge 80, the edge 80 is coated with a reflective coating. In still other embodiments, there is no frame or reflective material adjacent the edge 80 and the edge 80 includes light redirecting elements at its surface.

Figure 12:
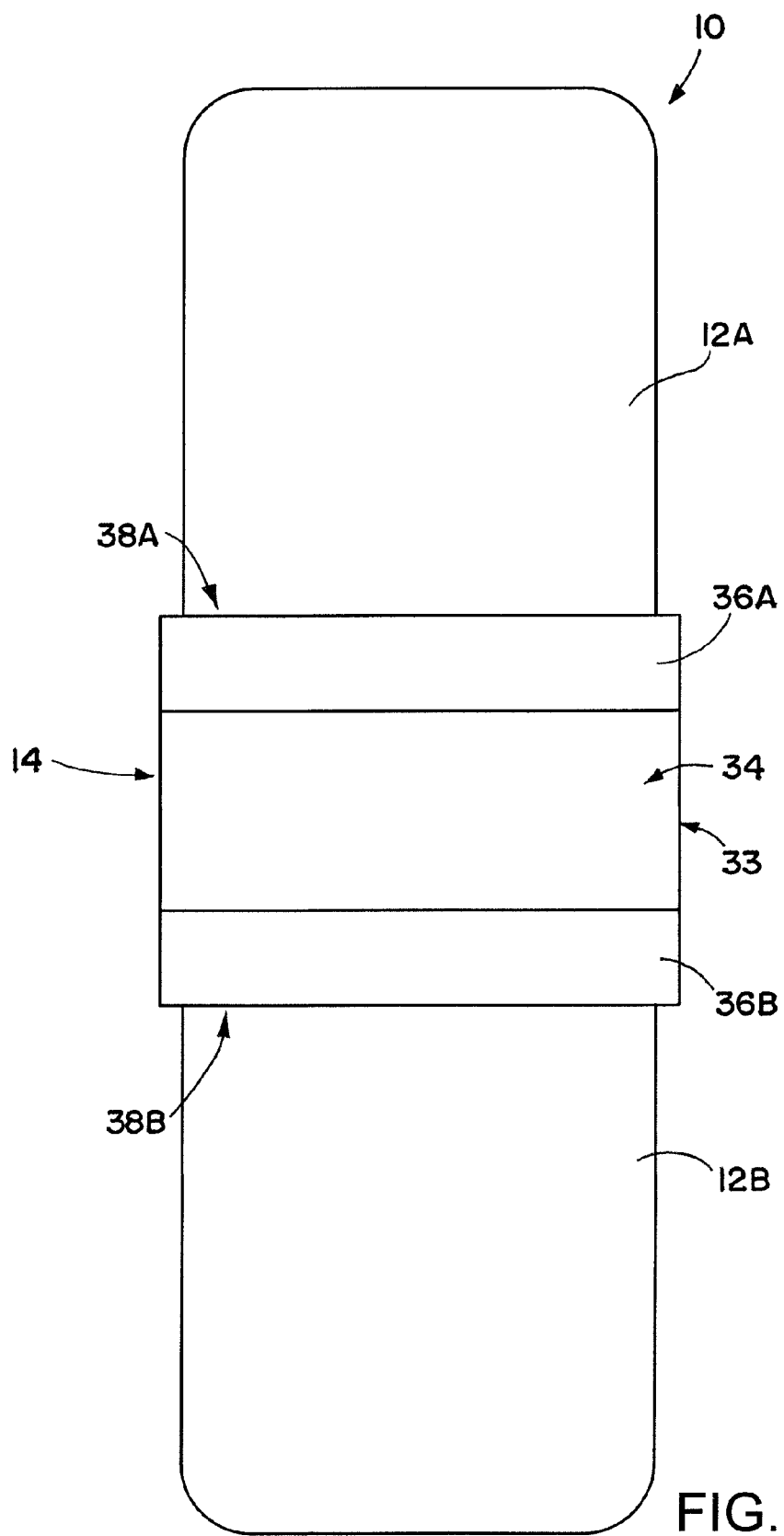
FIG. 12 is a schematic view of another exemplary lighting assembly.

As illustrated in FIG. 12, the light engine 14 is capable of retaining more than one light guide 12 and supplying light thereto. In the illustrated embodiment, the armature 33 retains a first light guide 12A and a second light guide 12B in respective receptacles 38A and 38B located opposite one another. Hence, the first light guide 12A and the second light guide 12B extend away from the centroid of the light engine 14 in different radial directions. In other embodiments, the light guides 12 extend from the light engine 14 in radial directions different from those illustrated, and/or at least partially overlap one another. Although not explicitly shown in FIG. 12, respective light sources 18 in the receptacles 38A, 38B supply light to the light guides 12A, 12B in the manner described above. Covers 36A, 36B respectively enclose the receptacles 38A, 38B in the manner described above. When more than one light guide 12 is present, each light guide 12 may be selectively illuminated so that the lighting assembly 10 is capable of producing different light outputs.

In one embodiment where the light engine 14 retains and supplies light to more than one light guide 12, the light guides 12 are configured as fan blades. In this embodiment, the light engine 14 is mounted to a driver that rotates the light engine 14 and the light guides 12 retained thereby. When rotated, the light guides 12 collectively move air. As a result, the lighting assembly 10 of this embodiment is a lighting fixture and a fan that can be mounted as a ceiling fixture, as a free standing fixture, or as part of another architectural unit. In another embodiment, each light guide 12 that is configured as a fan blade has its own associated light engine 14 and the light engine assemblies 14 are interconnected with a linking structure (e.g., the linking structure 78 of FIG. 10). In this case, the assembly of the linking structure, the light engine assemblies 14 and the light guides 12 are rotated to collectively move air. In either embodiment, the light fixture function and the fan function are independently controllable, so that the lighting assembly 10 can be selectively placed in one of several modes, such as, does not emit light and does not move air, emits light and does not move air, does not emit light and moves air, or emits light and moves air.

Figure 13:
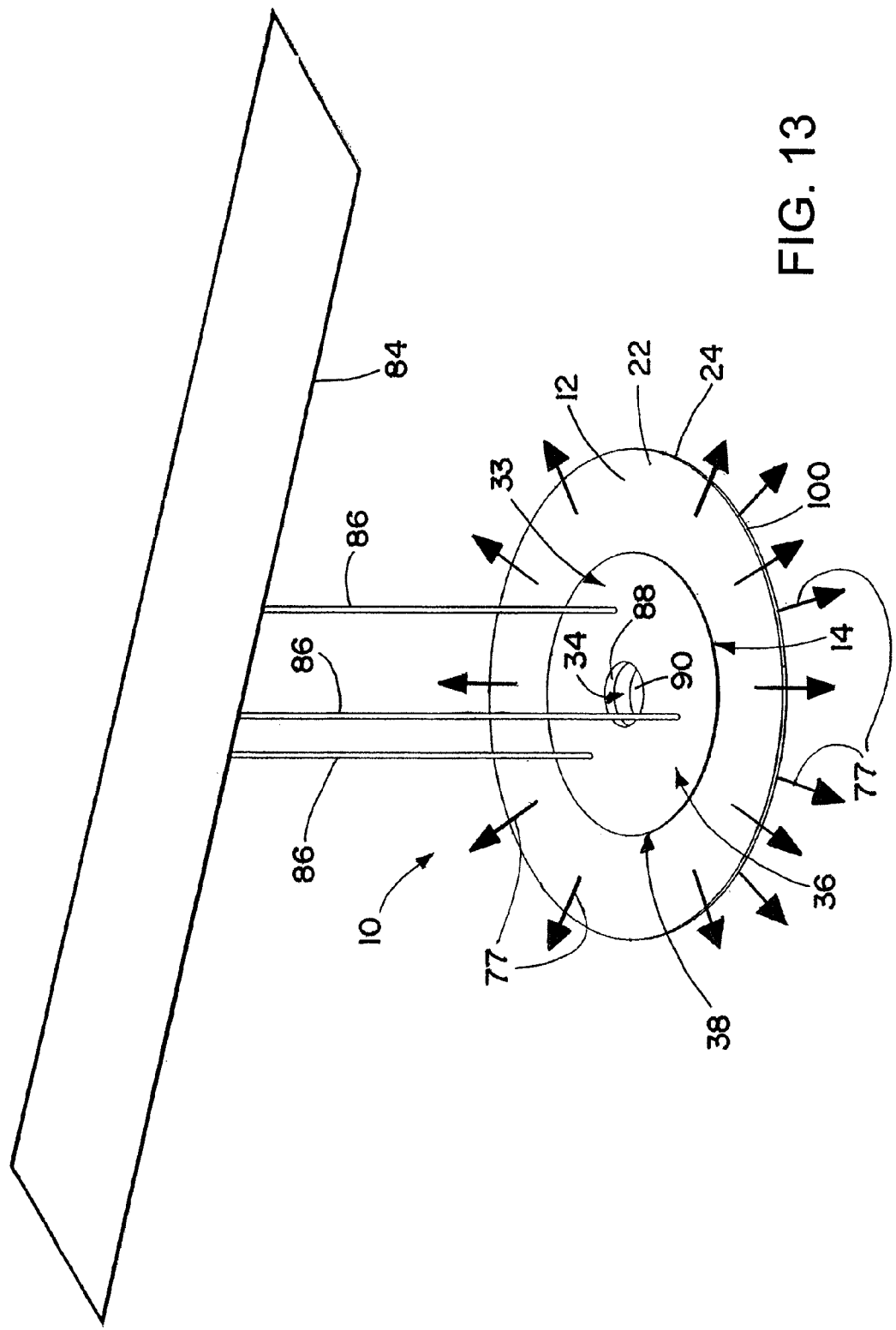
FIG. 13 is a schematic view of another exemplary lighting assembly.

Turning now to FIGS. 13-16, another embodiment of a lighting assembly 10 is shown. In this embodiment, a light guide 12 is retained and supplied with light by a light engine 14. The light engine 14 in this embodiment is surrounded by the light guide 12, which in the illustrated embodiment is disk-shaped. Other shapes that surround the light engine 14 are possible, such as a square, a rectangle, an oval, a triangle, a regular or irregular polygon, another geometric shape, or a non-geometrical shape. The illustrated light guide 12 is planar, but the light guide 12 may be curved (e.g., dome-shaped, frustroconical, etc.). FIG. 13 illustrates the lighting assembly 10 configured as a ceiling light that is suspended from a ceiling 84 by cables 86. The lighting assembly 10 may be mounted in other manners, such as to a wall, or may be free standing, such as when part of a floor lamp or a table lamp. Depending on the manner of installation, the lighting assembly 10 may be connected to an architectural surface or otherwise retained with appropriate support elements, such as the illustrated cables, or with electrical wires, rods, threaded fasteners, blocks, clips, etc.

FIG. 13 shows a complete lighting assembly 10 with exemplary light output rays shown with arrows 77 from both major surfaces 22, 24 of the light guide 12. In other embodiments, light-extracting elements are configured to output light through only one of the major surfaces 22, 24.

Figure 14:
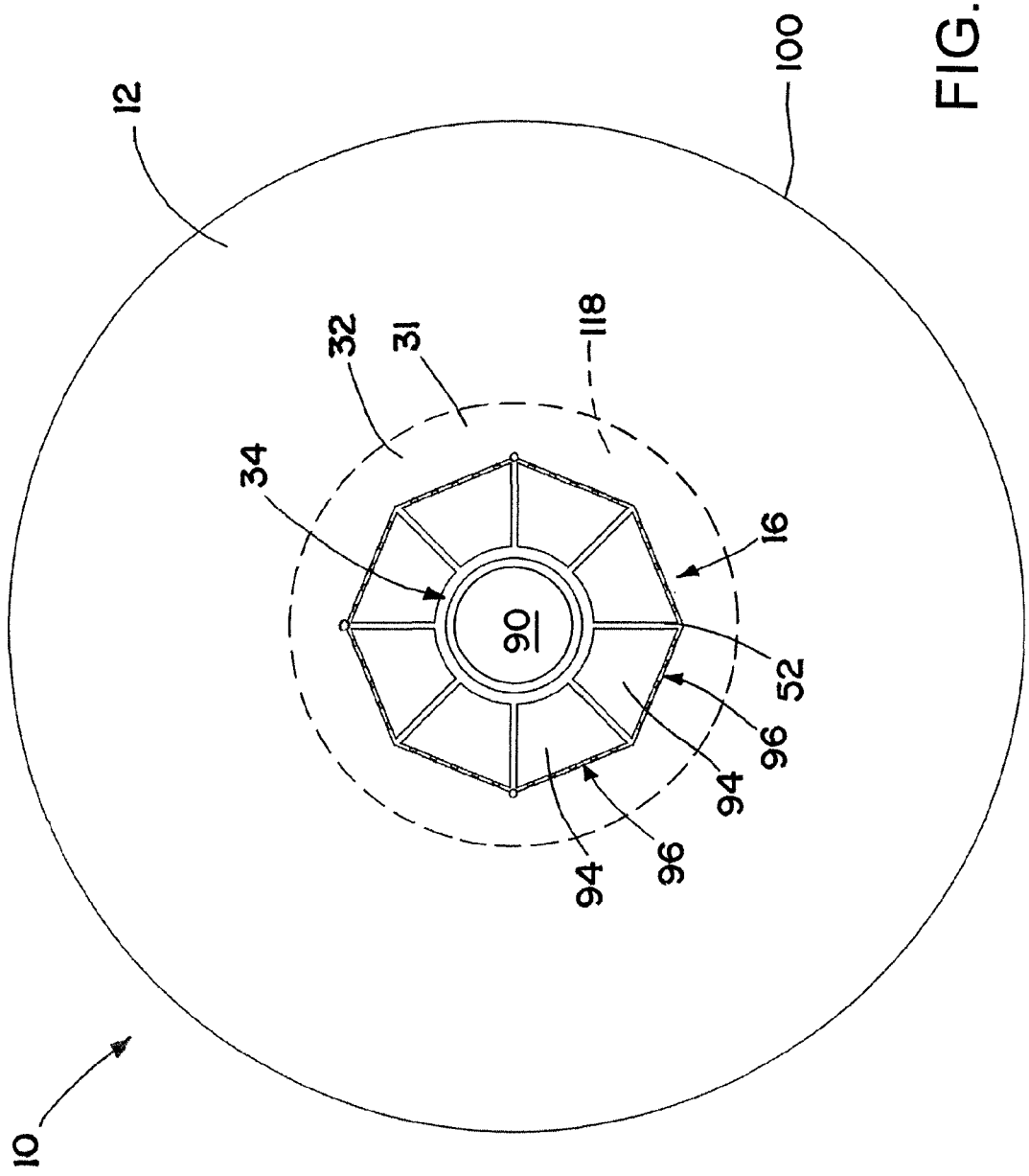
FIG. 14 is a schematic view of the lighting assembly of FIG. 13 with a cover of the light engine removed.
Figure 15:
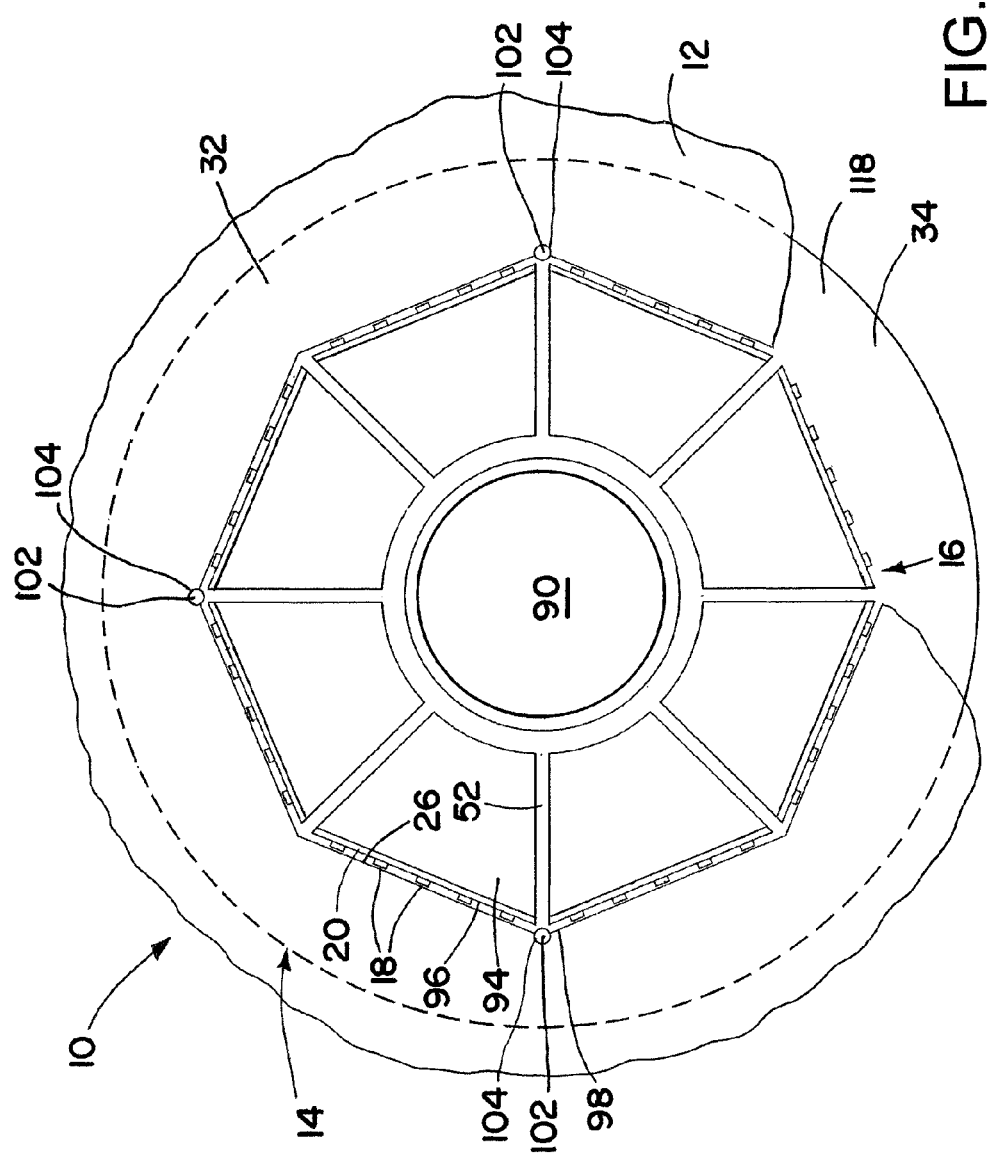
FIG. 15 is an enlarged schematic view of the view of FIG. 14 with the light guide shown partially cut away.
Figure 16:
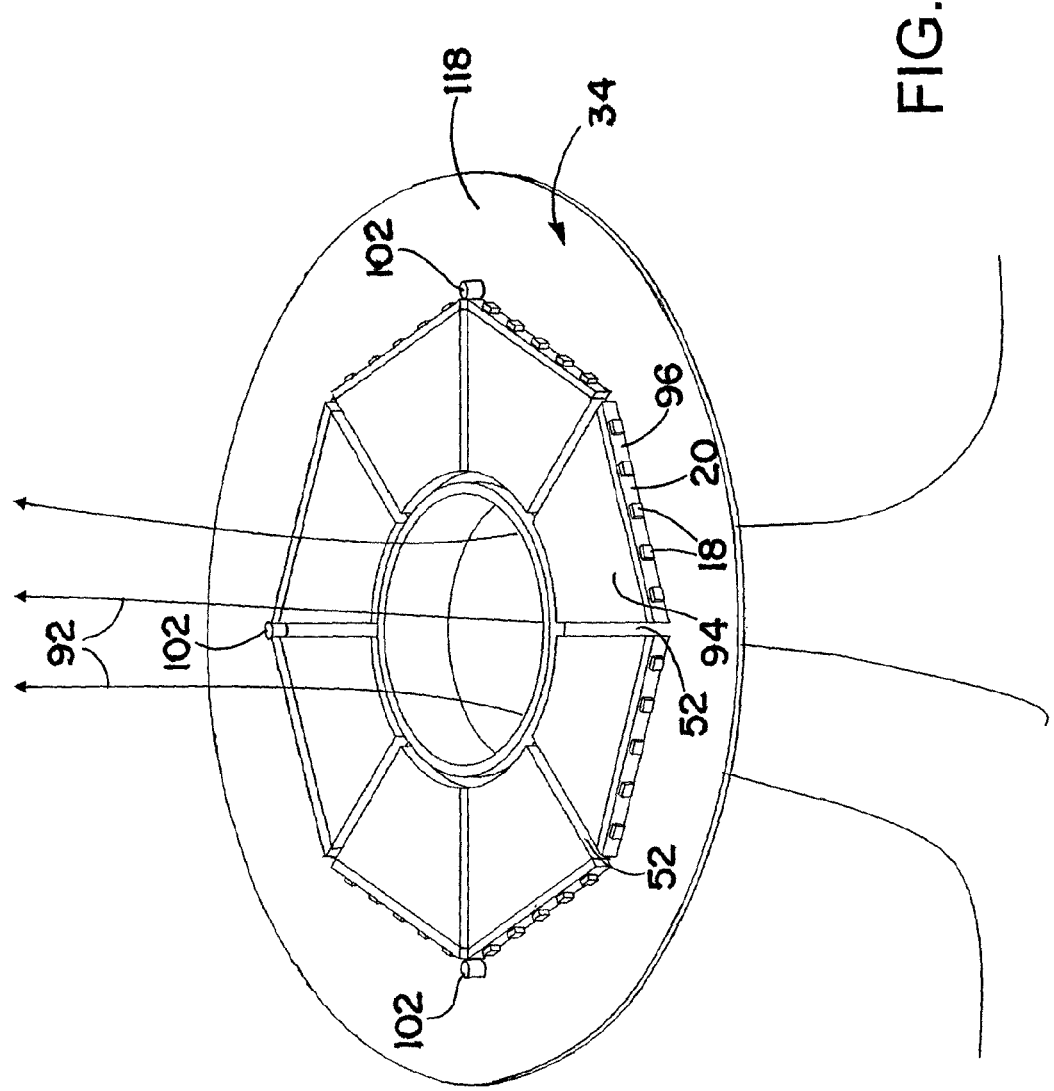
FIG. 16 is a schematic view of a portion of the light engine for the lighting assembly of FIG. 13.

Similar to the foregoing embodiments, the armature 33 of the light engine 14 of the embodiment of FIGS. 13-16 includes a mounting unit 34 and a cover 36 that cooperate to form a receptacle 38 that receives a received portion 32 of the light guide 12. In one embodiment, the received portion 32 includes a light transition region 31 of the light guide 12, the light transition region 31 being located between the light input edge 26 and the light-extracting elements. To illustrate this arrangement, FIG. 14 shows the lighting assembly 10 with the cover 36 removed. To further illustrate features of the light engine 10, FIG. 15 shows the lighting assembly 10 with the cover removed, the mounting unit 34 and light source assembly 16 enlarged, and the light guide 12 partially cut away. FIG. 16 shows the mounting unit 34 and light source assembly 16 in perspective without the light guide 12 present.

The cover 36 and the mounting unit 34 are annular and have respective through-holes 88, 90 that align with one another. As depicted by arrows 92 in FIG. 16, air is drawn and flows through the holes 88, 90 by convection due to heating by the light sources 18.

The light source assembly 16 is retained by the mounting unit 34 and surrounds the hole 90. In one embodiment, the mounting unit 34 includes bases 94 and each base retains one or more light source segments 96 of the light source assembly 16. Each light source segment 96 of the light source assembly 16 includes, for example, a printed circuit board 20 to which one or more light sources 18 (e.g., LEDs) are mounted. Electrical conductors (not illustrated) that supply electricity to each light source segment 96 may run through channels 52 between the bases 94.

In the illustrated embodiment, eight bases 94 and eight light source segments 96 are arranged along respective sides of an octagon. The light source segments 96 need not be planar and could be curved. The collective shape of the light source segments 96 matches the shape of a hole 98 in the light guide 12. The edge of the light guide 12 that defines the hole 98 is the light input edge 26. In the illustrated embodiment, the light input edge 26 is orthogonal to and extends between the major surfaces 22, 24. The shape match between the light input edge 26 and the light source assembly 16 allows for the distance between each light source 18 and the light input edge 26 to be defined. Shapes other than the illustrated octagon are possible, such as a triangle, a rectangle, a square, a pentagon, a hexagon, a circle, an oval, etc. For shapes defined with linear light source segments 96, the higher the number of light source segments 96, the closer the shape approximates to a circle or other non-segmented geometry. The hole 98 need not be in the center of the light guide 12.

The light guide 12 has an outer edge 100 opposite the light input edge 26. The outer edge 100 may have a shape that is the same as the light input edge 26. Alternatively, the outer edge 100 has a different shape. For instance, in the illustrated example where the light input edge 26 is an octagon, the outer edge 100 is a circle.

As indicated, the distance between the light input edge 26 and each light source 18 is defined. The distance may be zero (e.g., where the light input edge 26 and the light sources 18 touch). The distance is defined primarily by the relative shape and size of the light input edge 26 and the light source assembly 16, and secondarily by mechanical interaction between the light guide 12 and the light engine 14 that defines the position of the light guide relative to the light engine. For example, contact between the light guide 12 and one or more of the bases 94 may be used to define the position of the light input edge 26 relative to the light source assembly 16, similar to the manner in which the spacing protrusions 54, 56 contact the back wall 48 of the receptacle 38 in the embodiment of FIGS. 1-4 in that embodiment. In the illustrated embodiment, the light engine 14 includes alignment members 102 that interact with corresponding alignment receptacles 104 (e.g., notches) in the light guide 12 to define the position of the light input edge 26 relative to the light source assembly 16. The alignment members 102 may be integral with the mounting unit 34 or may be inserted into holes in the mounting unit 34. Alternative alignment members 102 include, but are not limited to, threaded fasteners, clips, rivets, detent or indents on one of the mounting unit 34 and/or the cover 36 that coordinate with indents or detents on the light guide 12, resilient fingers, adhesive, etc. Some alignment members 102 may allow removal and replacement of the light guide 12, while others may be permanent fasteners. In the illustrated embodiment, the alignment members 102 are further configured to define the position of the light input edge 26 relative to the light source assembly 16 in a direction parallel to the light input edge 26 and to the major surfaces 22, 24 for each light source segment 96.

In one embodiment, the light guide 12 and the light source assembly 16 are keyed so that the angular alignment between the light input edge 26 and the light source assembly 16 is defined. In one embodiment, the mounting unit 34 receives the light guide 12 in only one angular orientation. In other embodiments, the mounting unit 34 may be received in more than one angular orientation, such as when one or both of the light source assembly 16 and the light guide 12 are symmetrical. In the illustrated embodiment, the alignment members 102 and the alignment receptacles 104 are arranged to permit placement of the light guide 12 onto the mounting unit 34 in only one angular orientation relative to one another.

Defining the angular orientation of the light input edge 26 relative to the light source assembly 16 of the light source assembly 16 is desirable in embodiments where the light-extracting elements at the light guide 12 are configured in cooperation with a defined arrangement of the light sources 18 of the light source assembly 16, as will be described next.

Figure 17:
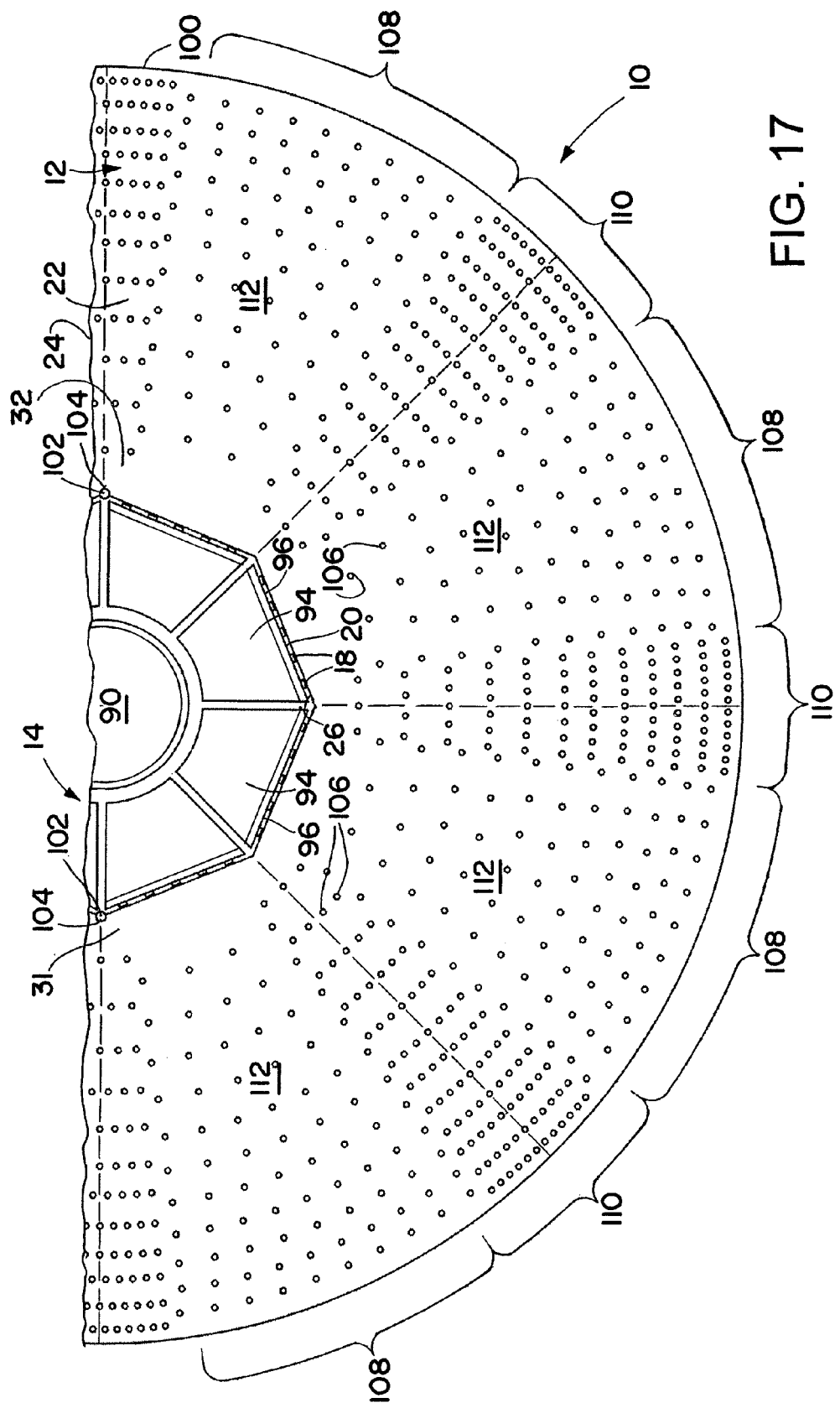
FIG. 17 is another schematic view of the lighting assembly of FIG. 13 with the cover of the light engine removed, the light guide shown partially cut away, and the light engine shown partially cut away.

With additional reference to FIG. 17, the light-extracting elements 106 on the light guide 12 are configured based on a defined configuration of the light source segments 96 and the light sources 18 thereon. The light-extracting elements 106 are represented by circles for illustration purposes. As described above, the shapes of the light-extracting elements 106 are not necessarily circular, especially for micro-optical elements. The cover 36 of the light engine 14 is removed in the view of FIG. 17 to show exemplary internal components of the light engine 14.

In the embodiment of FIG. 17, the light-extracting elements 106 extract light from at least one of the major surfaces 22, 24. Also, the light-extracting elements 106 are arranged in radially-extending regions 108 of lower light-extracting capability interleaved with radially-extending regions 110 of higher light-extracting capability. Each radially-extending region 108, 110 extends radially outward from the light input edge 26 towards the outer edge 100. The light guide 12 is considered to have segments 112. In the illustration of FIG. 17, exemplary distinctions between adjacent light guide segments 112 of the light guide 12 are shown using broken lines. Each segment 112 includes a region 108 of lower light-extracting capability, a portion of a region 110 of higher light-extracting capability adjacent one side of the region 108 of lower light-extracting capability, and a portion of a region 110 of higher light-extracting capability adjacent the other side of the region 108 of lower light-extracting capability. Therefore, each radially-extending region 110 of higher light-extracting capability delineates adjacent light guide segments 112 of the light guide 12.

In one embodiment, each light source segment 96 corresponds to a light guide segment 112. Additionally, each light source segment 96 inputs light into the light guide 12 with an angular spread sufficient to illuminate the corresponding one of the light guide segments 112 and at least a portion of any adjacent light guide segments 112.

In one embodiment, the regions 108 of lower light-extracting capability and the regions 110 of higher light-extracting capability form a repeating pattern in a circumferential direction around the hole 98. In one embodiment, and in the case where the hole 98 is polygonal, each side of the polygon corresponds to one of the light source segments 96 and each vertex of the polygon corresponds to one of the regions 110 of higher light-extracting capability.

In one embodiment, the regions 108, 110 of light-extracting elements and the angular spread of light output from the light source segments 96 are coordinated to achieve a desired light output intensity profile (e.g., a uniform light output intensity profile) and/or a desired light ray angle distribution (e.g., a uniform light ray angle distribution) from one or both of the major surfaces 22, 24. For instance, in one embodiment, the light-extracting elements 106 of the regions 108, 110 are configured so that light output from the light guide 12 is uniform in intensity in a circumferential region about the centroid of the hole 98. In one embodiment, the increased light-extracting capability of the regions 110 relative to the light-extracting capability of the regions 108 compensates for variations in light input into the light guide 12 from the light source assembly 16 due to the shape of the light source assembly 16. For example, at the vertices between adjacent light source segments 96 in a polygon-shaped light source assembly 16, there is potentially less light available to the light guide 12 than in the middle of the light source segments 96. The differences in light availability can be overcome with differences in light-extracting capabilities, as explained.

The difference in the light-extracting capability of the region 108 and the light-extracting capability of the region 110 may be achieved by changing one or more than one characteristic of the light-extracting elements 106 in the respective regions 108, 110. Exemplary characteristics that may be changed include size of the light-extracting elements 106, shape of the light-extracting elements 106, depth or height of the light-extracting elements 106, density of the light-extracting elements 106, orientation of the light-extracting elements 106, slope angle of the light-extracting elements 106, and index of refraction of the light-extracting elements 106. The example shown in FIG. 17 is simplified to show more clearly the differences between the regions of lower light extracting capability 108 and the regions of higher light extracting capability 110. In practical embodiments, a transition region (not illustrated), in which the light extracting capability changes progressively, exists between each region of lower light extracting capability 108 and each region of higher light extracting capability 110.

In one embodiment, the outer edge 100 has light redirecting elements in or on the surface of the outer edge 100 to control light that is output from the outer edge 100. In other embodiments, the outer edge 100 is coated with a reflective coating or a reflector is positioned adjacent the outer edge 100 to reflect light that exits the outer edge 100 back into the light guide 12.

Figure 18:
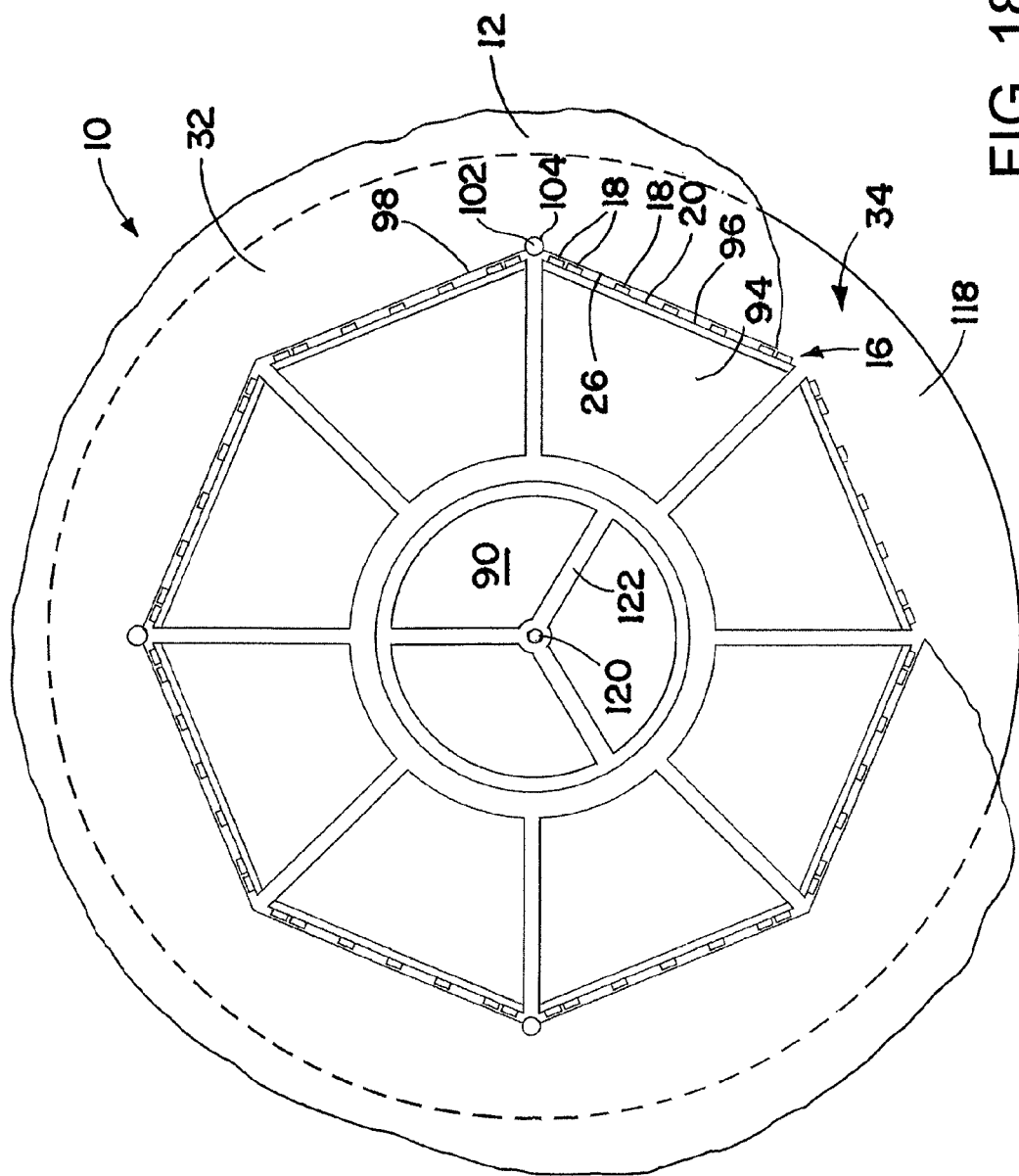
FIG. 18 is a schematic view of another embodiment of the lighting assembly of FIG. 13 with the cover of the light engine removed and the light guide shown partially cut away.

With additional reference to FIG. 18, illustrated is an embodiment in which the light sources 18 in each light source segment 96 are variably spaced to apodize the light output by the light source segment. In the illustrated embodiment, the spacing between adjacent ones of the light sources 18 is decreased near the vertices between the light source segments 96. This increases the light supply to areas of the light guide 12 that extend radially outward from the vertices. Without apodization, these areas would receive a smaller portion of the light output of the light source segments 96 compared to areas that extend radially outward from the centers of the light source segments 96.

Figure 19:
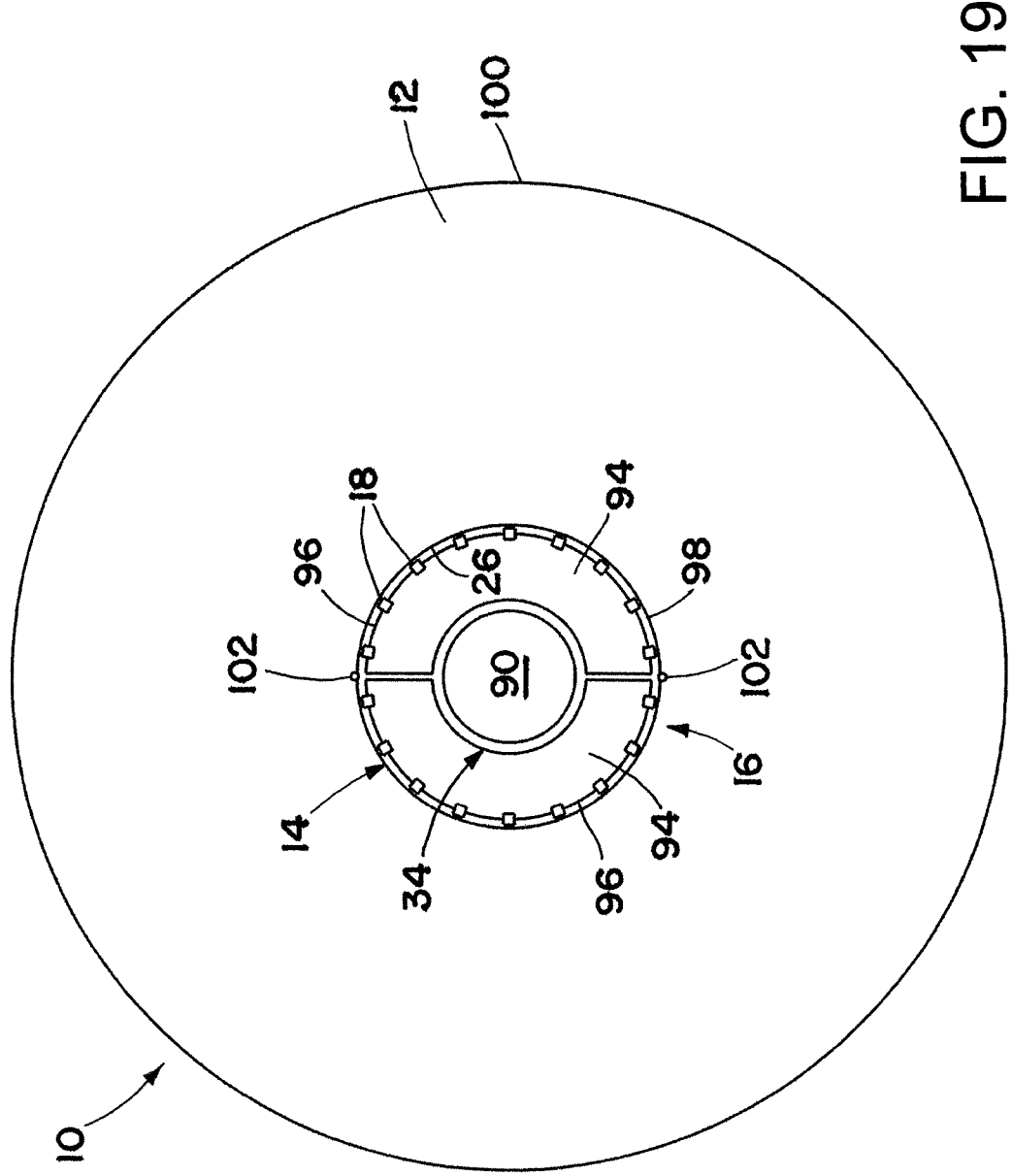
FIGS. 19-24 are schematic views of additional exemplary lighting assemblies.

With additional reference to FIG. 19, illustrated is an embodiment of the lighting assembly 10 where the shape of the light source assembly 16 and shape of the corresponding hole 98 are non-polygonal. In the illustrated case, the shapes are circular. The cover 36 of the light engine 14 is removed in the view of FIG. 19 to show exemplary internal components of the light engine 14. In this embodiment, the light source segments 96, and the bases 94 to which the light source segments 96 are mounted, are arcuate and have a radius that matches the radius of the hole 98. Additionally, the light sources 18 are uniformly spaced around the circumference of the light source assembly 16.

Figure 20:
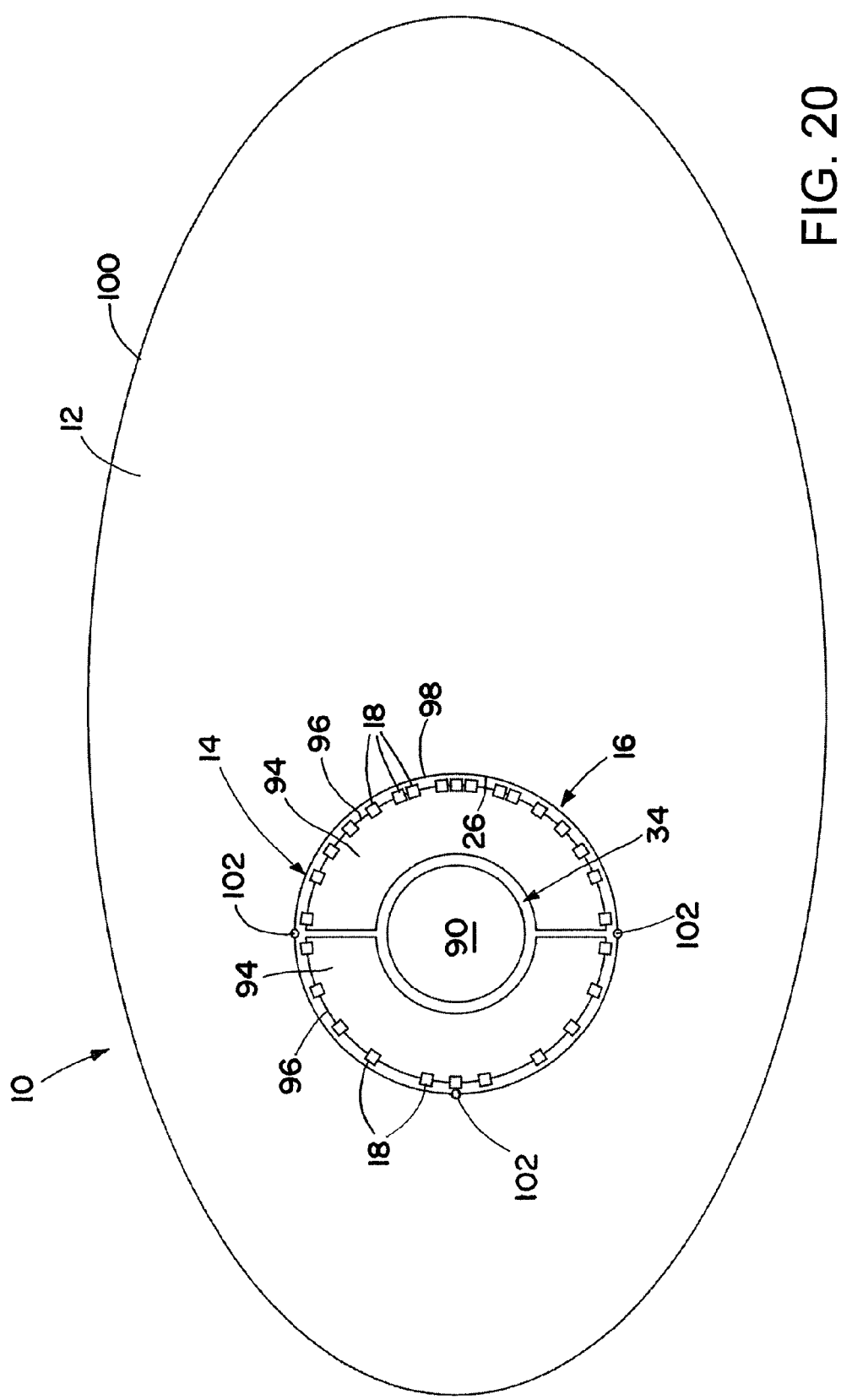
Figure 21:
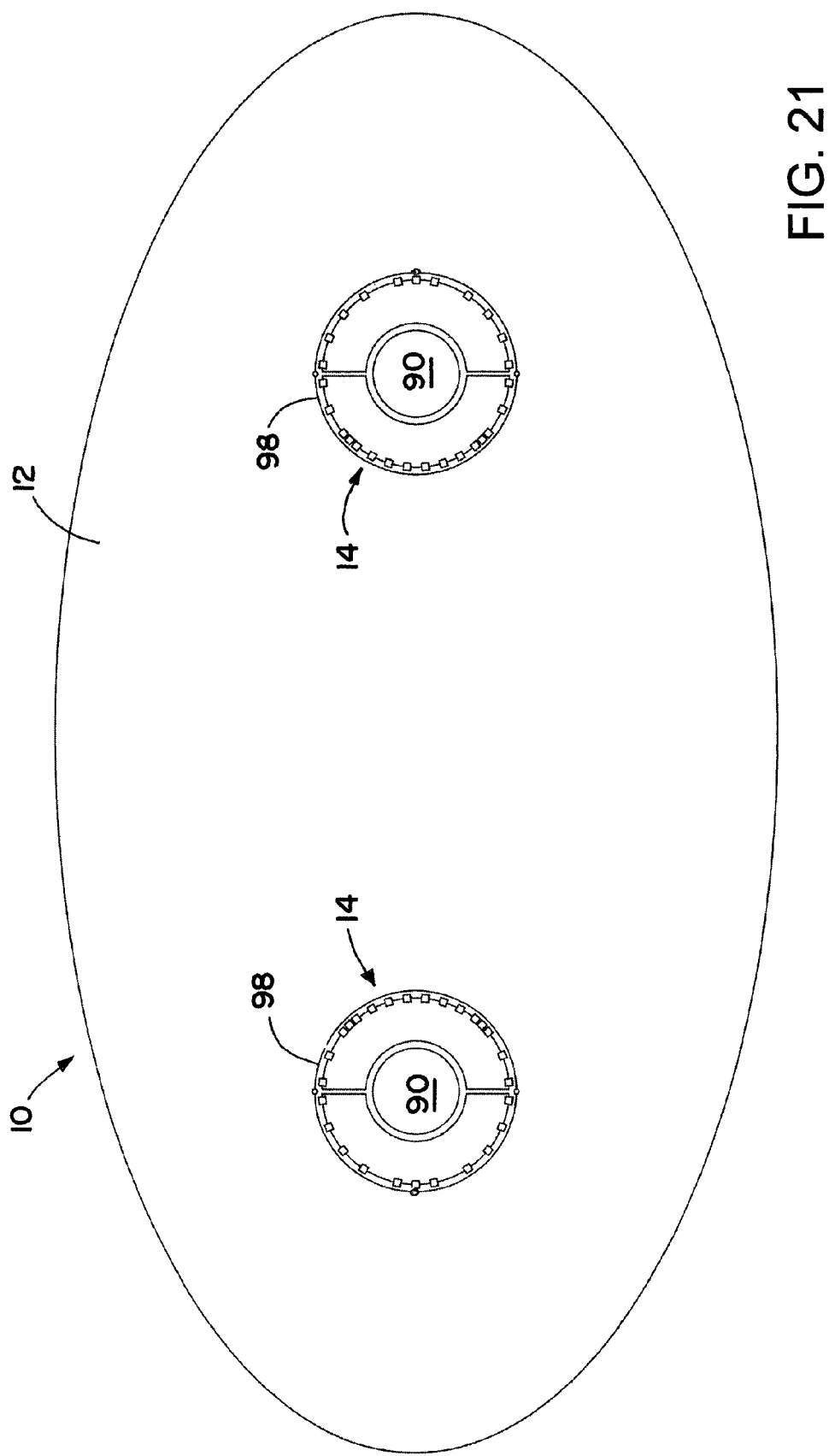

With additional reference to FIGS. 20 and 21, illustrated are lighting assembly 10 embodiments where the shapes of the light source assembly 16 and the corresponding holes 98 are non-polygonal. The cover 36 of each light engine 14 is removed in the views of FIGS. 20 and 21 to show exemplary internal components of the respective light engine 14. Also, the light guide 12 in each embodiment has a hole 98 that is not centered relative to the light guide 12 and the light guide 12 is not evenly distributed about the respective light source assembly 16. This would be true even if the holes 98 were in the centers of the light guides 12. Moreover, the distance from the light input edge 26 to the outer edge 100 varies when measured along lines that extend radially from the centroid of the hole 98 in different directions. In the embodiment of FIG. 21, the light guide 12 has more than one hole 98 and is supplied with light by a corresponding number of light engines 14.

In these embodiments, the distribution of light sources 18 is dependent on the relative areas of the equal-angle light guide segments 112 (FIG. 17. Not shown in FIGS. 20 and 21) extending between the light input edge 26 and the outer edge 100 to achieve a nominally-uniform light intensity profile from one or both of the surfaces 22, 24 of the light guide 12. Due to the non-uniform spacing of the light sources around the light input edge 26, the configurations of the light extracting elements 106 (not shown in FIGS. 20 and 21) differ among the light guide segments 112 to achieve the nominally-uniform light intensity profile from one or both of the surfaces 22, 24 of the light guide 12. In the embodiment of FIG. 21 where there are two light engines 14, and in other embodiments where there are two light engines 14 associated with the one light guide 12, as the light engines 14 are moved closer together, the number of light sources 18 in one light engine 14 that face the other light engine 14 decreases relative to the number of light sources 18 that face away from the other light engine 14.

Figure 22:
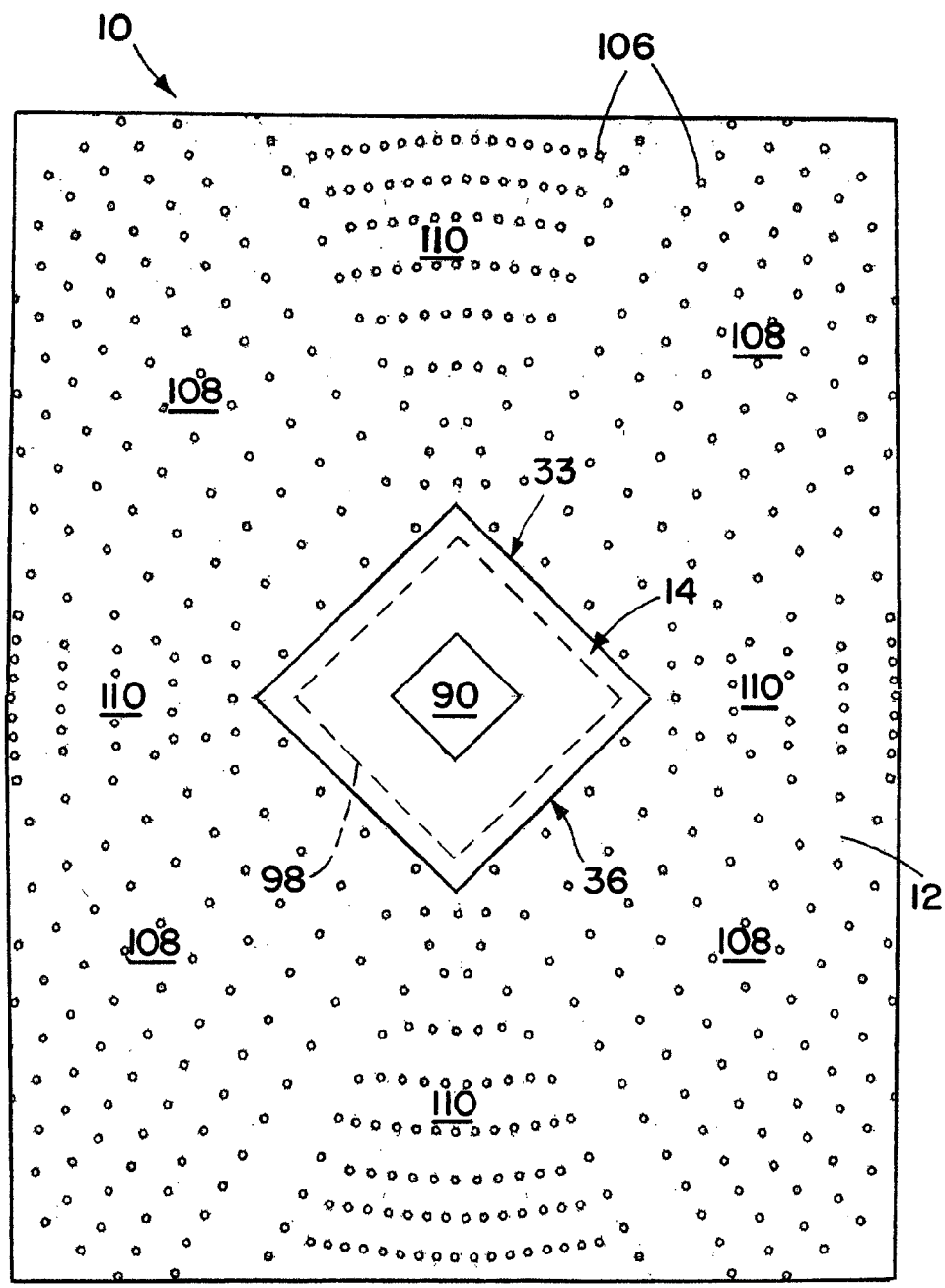

FIG. 22 shows another embodiment of a lighting assembly 10. In this embodiment, the light guide is rectangular and has a rectangular hole 98, which is hidden in this view by the cover 36 of the light engine 14. The four light source segments 96 of the light source assembly 16 (hidden by the cover 36) are arranged in a rectangle to correspond to the shape of the hole 98 defined in the light guide 12. Similar to the embodiment of FIG. 17, the light guide 12 of FIG. 22 includes light-extracting elements 106 configured to form regions 108 of lower light-extracting capability interleaved with regions 110 of higher light-extracting capability. Each radially-extending region 108, 110 extends radially outward from the hole 98 and along the light guide 12 from the light input edge 26 towards the outer edge 100. The regions 110 of higher light-extracting capability extend radially outward along vectors that extend from the vertices between light source segments 96.

The embodiments of FIGS. 13-22 show the light engine 14 surrounded by the light guide 12. In other embodiments, the light engine 14 is not completely surrounded by the light guide 12. One example of this configuration is the embodiments of FIGS. 1-12.

Figure 24:
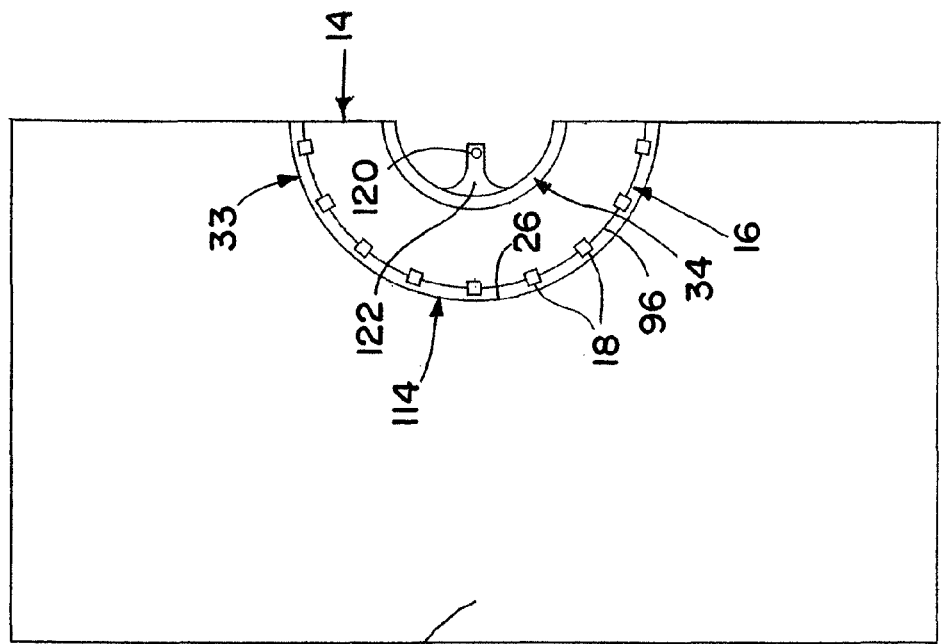
Figure 23:
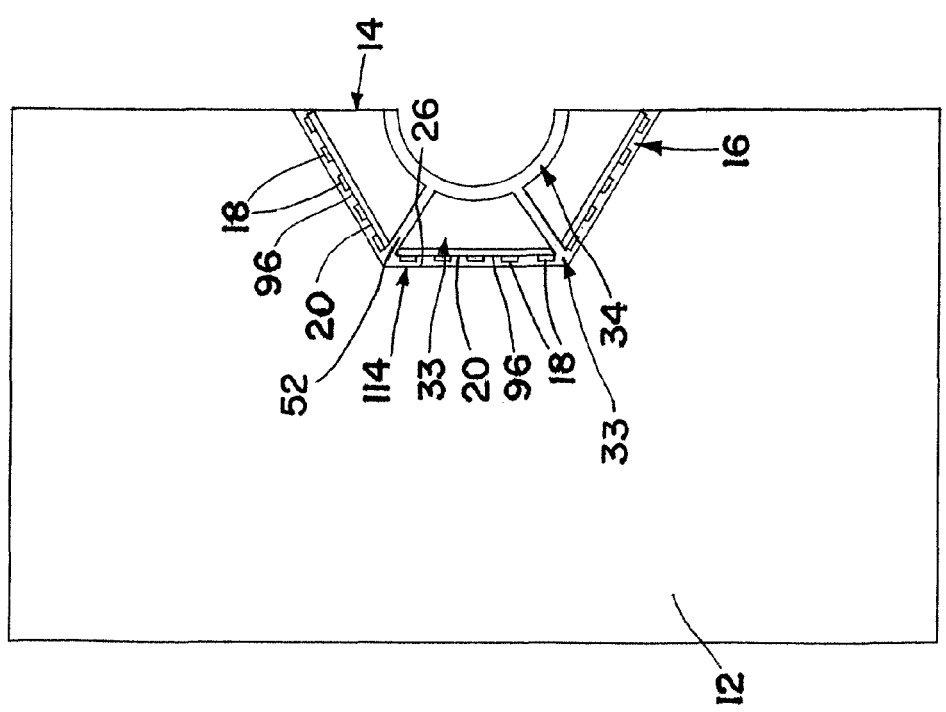

Another example where the light engine 14 is not completely surrounded by the light guide 12 is shown in FIGS. 23 and 24. In these embodiments, the light guide 12 has a notch 114 in an edge of the light guide 12. At least part of the edge of the light guide 12 in the notch 114 provides the light input edge 26, and the light source assembly 16 of the light engine 14 is configured to match the geometric shape of the notch 114 to supply light to the light guide 12 through the light input edge 26. The cover 36 of each light engine 14 is removed in the views of FIGS. 23 and 24 to show exemplary internal components of the respective light engine 14. Similar to foregoing embodiments, the light source assembly 16 of FIG. 23 has light source segments 96 that form a shape that matches the shape of the notch 114 and, hence, matches the shape of the light input edge 26. In the embodiment of FIG. 24, the notch and the light source assembly 16 have matching curvatures.

For the various embodiments of the lighting assembly 10, aspects of the lighting assembly 10 may be configured in view of the configuration of the light guide 12 to achieve a desired light output intensity profile and/or a desired light ray angle distribution from the light guide 12. Exemplary aspects of the lighting assembly 10 that may be configured include the shape of the light input edge 26 (e.g., the shape of the hole 98 or the shape of the notch 114) and the shape of the light source assembly 16, the number of light source segments 96, the variation in spacing between light sources 18 within a light source segment 96 to apodize the light sources 18, the angular spread of light output from the light source segments 96, and the configuration of the regions 108, 110 (e.g., FIGS. 17 and 22) of light-extracting elements 106.

Figure 25:
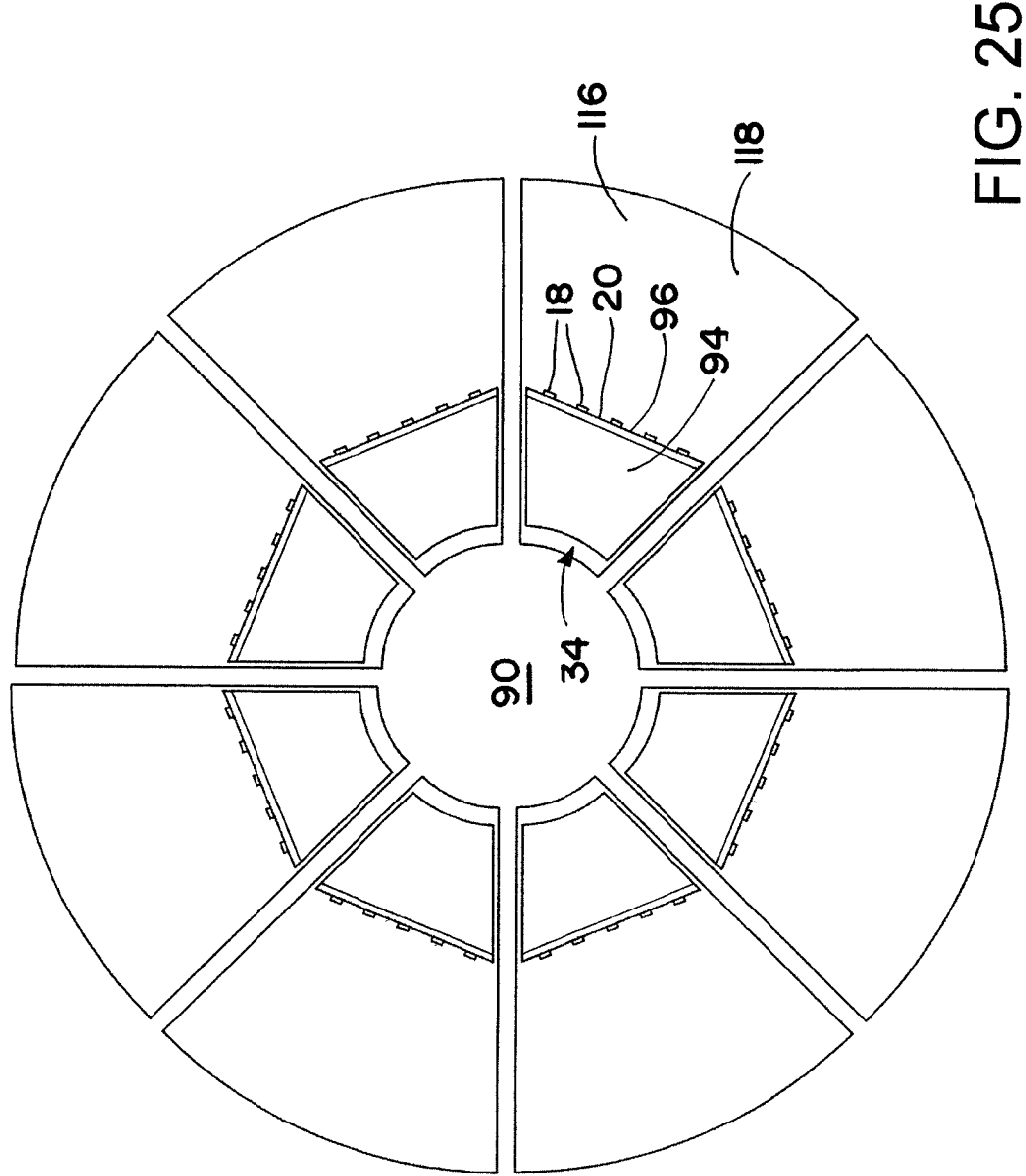
FIG. 25 is a schematic view of another embodiment of a light engine for a lighting assembly.

In one embodiment, the mounting unit 34 is monolithic. In another embodiment, such as is illustrated in the exploded view of FIG. 25, the mounting unit 34 is made from discrete mounting unit segments 116 that are assembled to form the mounting unit 34. Each mounting unit segment 116 retains at least one of the light source segments 96. In one embodiment, the light source segment 96 of each mounting unit segment 116 supplies light to a corresponding light guide segment 112 (e.g., FIG. 17) of the light guide 12. In another embodiment, each mounting unit segment 116 of the mounting unit 34 supplies light to a corresponding light guide 12 (not illustrated in FIG. 25) that is distinct from light guides 12 respectively supplied with light from the other mounting unit segments 116.

Referring to FIG. 15, for example, a platform portion 118 of the mounting unit 34 supports the light guide 12. More specifically, the platform portion 118 supports the major surface 24 side of the received portion 32 of the light guide 12. In one embodiment, the platform 118 that supports the major surface 24 side of the received portion 32 is planar. In another embodiment, the platform 118 has radial grooves (not illustrated, but similar to the grooves 72 of the embodiments of FIGS. 1-12) to establish airflow channels between the light guide 12 and the mounting unit 34.

As indicated, the cover 36 is secured to the mounting unit 34 to form the armature 33 and complete the receptacle 38. For instance, a portion of the cover 36 connects to the mounting unit 34 and is secured thereto, such as with threaded fasteners 43. Alternatively, the cover 36 may be secured to mounting unit 34 with pins, adhesive, welds, clips, rivets, or another appropriate fastener. In another embodiment, the cover 36 mates directly with the mounting unit 34 without the use of additional fasteners. For example, the cover 36 may screw into or onto the mounting unit 34, or snap fit into or onto the mounting unit 34.

In some embodiments, such as those shown in FIGS. 1, 20, 23 and 24, another portion of the cover 36 supports the light guide 12. More specifically, this portion of the cover 36 supports the major surface 22 side of the received portion 32 of the light guide 12. Regardless of whether the cover 36 supports the light guide, in one embodiment of the cover 36, the surface of the cover 36 adjacent the major surface 22 side of the received portion 32 is planar. In another embodiment of the cover 36, the surface of the cover 36 adjacent the major surface 22 side of the received portion 32 has grooves (e.g., similar to the grooves 72 of the embodiments of FIGS. 1-12) to establish airflow channels between the light guide 12 and the cover 36.

In the illustrated embodiments, the bases 94 and the light sources 18 are located within the hole 98 or within the notch 114.

As indicated, the alignment members 102, or other securing elements as described above, define the distance between the light input surface 26 of the light guide 12 and the light sources 18. The light guide 12 is further secured in place by a clamping force applied to the light guide by the mounting unit 34 and the cover 36. In one embodiment, the height of the bases 94 is the same as the thickness of the light guide 12. In one embodiment, the light guide 12 is configured to be removed by a user of the lighting assembly 10 so that the light engine 14 may be replaced (e.g., the light guide 12 is reused) or the light guide 12 may be replaced (e.g., the light engine 14 is reused with a different light guide 12).

In one embodiment, the platform 118 and the inner surface of the cover 36 are reflective to reflect light from the light sources 18 into the light guide 12 through the light input edge 26 in the same manner as described above with reference to FIG. 9. As an alternative, reflective material (e.g., reflective films similar to reflectors 28 and 30) is respectively placed between the platform 118 and the major surface 24 of the light guide 12 and between the cover 36 and the major surface 22 of the light guide 12.

Although not illustrated, the light engine 14 may include a heat sink. For example, fins similar to fins 70 of FIGS. 1-12 may extend radially into one or both of the holes 88, 90 (FIG. 13) from the edges of the armature 33 that define the holes 88, 90. Alternatively, fins may extend axially from the armature 33, e.g., from one or both of the mounting unit 34 or the cover 36. Additionally or alternatively, radial fins (not shown) may be located on the surface of one or both of the mounting unit 34 and the cover 36. In one embodiment, where the light guide 12 is intended to be mounted vertically, the heat sink (not shown) extends axially from the light engine 14. Additionally, the holes 88 and 90 may be omitted.

Returning to FIGS. 18 and 24, the light engine 14 may include an additional light source 120 that emits light in a direction having an axial component relative to the light engine 14. The additional light source 120 may be included in any of the embodiments described herein. In the illustrated embodiment, a support member 122 couples the additional light source 120 to the armature 33. The additional light source 120 is configured to output light from the lighting assembly 10 independently of the light output by the light guide 12. In one embodiment, the light output from the lighting assembly 10 and generated by the additional light source 120 is of a different color than the light output from the light guide 12 and generated by the light source assembly 16. In one embodiment, operation of the additional light source 120 and operation of the light source assembly 16 are independently controlled.

Figure 26:
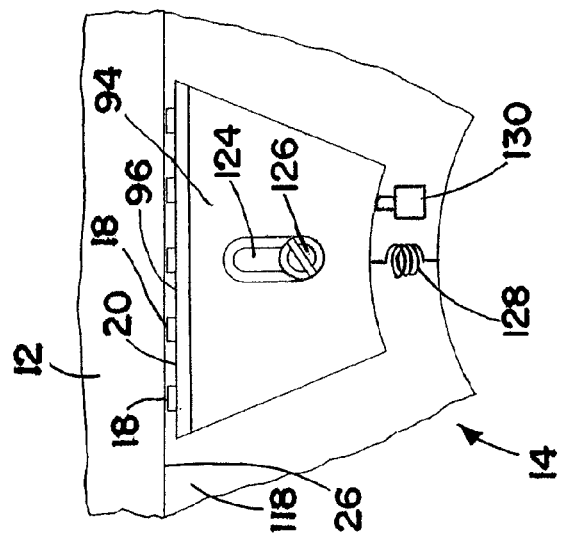
FIGS. 26-28 are schematic views of additional embodiments of a light engine for a lighting assembly.
Figure 27:
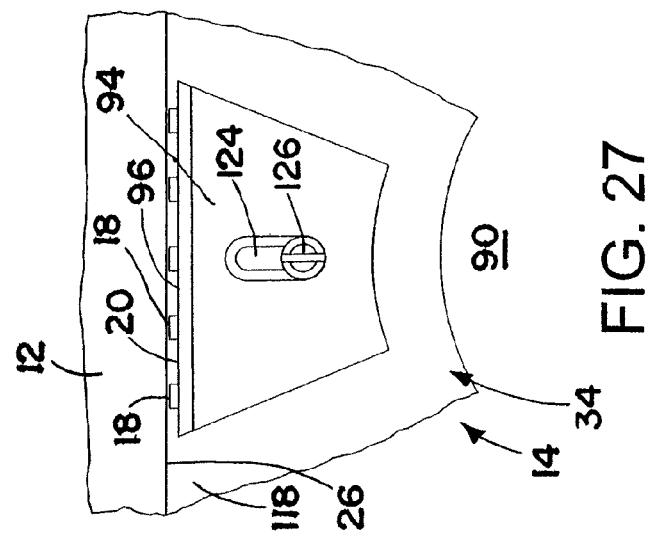
Figure 28:
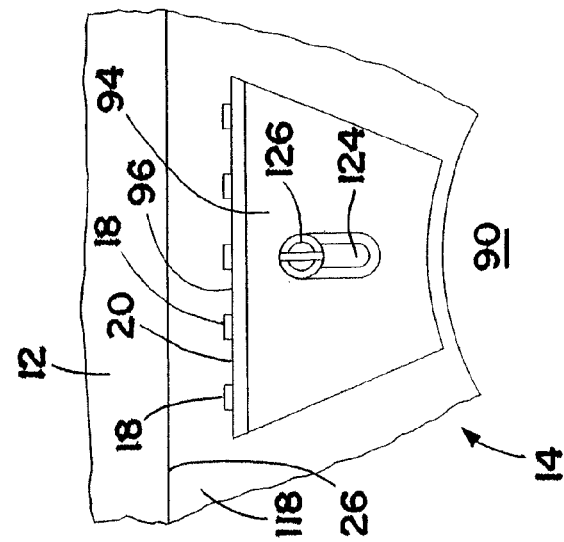

With additional reference to FIGS. 26-28, the light engine 14 is configured to allow the light sources 18 to move relative to the light guide 12 between a light input position and a retracted position at which the distance between the light sources 18 and the light guide 12 is greater than at the light input position. In one embodiment, the bases 94, together with the light source segments 96 attached thereto, are moveable with respect to the mounting unit 34 between the retracted position shown in FIG. 26 in which the light sources 18 and the light input edge 26 are spaced apart by a first distance, and the light input position shown in FIG. 27 in which the light sources 18 and the light input edge 26 are spaced apart by a second distance that is smaller than the first distance. The light input position is an operating position in which the light sources 18 input light into the light guide 12. The retracted position is used during assembly of the lighting assembly 10 so that when the light engine is inserted into the hole 98 or notch 114, the light guide 12 does not inadvertently contact and damage the light sources 18. In one embodiment, the bases 94 include a slot 124. A screw 126 extends through the slot 124 and into the mounting unit 34. The screw is loosened to enable the respective base 94 to be moved between the retracted position and the light input position, and vice versa, and is tightened to retain the base 94 in the retracted position or the light input position. In other embodiments, a resilient member, such as the illustrated spring 128 (FIG. 28) urges the base 94 into the light input position. The base 94 is guided by the screw 126 that is loosened to allow movement between the retracted position and the light input position, and is tightened to retain the base 94 in the refracted position during installation of the light guide 12. Additionally, the screw 126 may be tightened to retain the base 94 in the light input position after the light guide 12 has been installed.

In one embodiment, the light engine 14 includes a mechanism 130 that causes the light source assembly 16 to automatically move between the retracted position and the light input position. In one embodiment, the mechanism 130 operates in response to installation (retracted position to light input position) or removal (light input position to retracted position) of the cover 36. For instance, installing the cover 36 causes the mechanism 130 to urge the bases 94 (e.g., with a cam action) and retained light source segments 96 into the light input position. Removing the cover causes the mechanism 130 to move the bases 94 and light source segments 96 into the retracted position in which the light guide 12 can be removed or installed. Thus, the mechanism 130 operates in response to installation and removal of the cover 36.

Turning now to the embodiments of FIGS. 29-32, shown are additional embodiments of the lighting fixture 10. In these embodiments, a light mixing guide 132 forms part of the light engine 14 and is located between the light source segments 96 and the light guide 12. The light mixing guide 132 has a first major surface 134, a second major surface 136 opposite the first major surface 134, a curved outer edge defining a light output edge 138, and a light input edge 140 having a radial component with respect to the centroid of the light mixing guide 132. Light from a respective light source segment 96 is input into the light mixing guide 132 through the light input edge 140 and propagates through the light mixing guide 132 by total internal reflection at the first and second major surfaces 134, 136 and, as will be explained, at the light output edge 138. The example shown has four light input edges 140 and corresponding light source segments 96 circumferentially offset from one another at 90 degree intervals. More or fewer light input edges 140 may be used.

The light engine 14 includes the armature 33. In one embodiment, the armature 33 includes the mounting unit 34 and the cover 36, but the cover 36 is removed in FIGS. 29, 31 and 32 to better show internal structure of the lighting assembly 10. The cover 36 is present in the view of FIG. 30.

Each light source segment 96 is coupled to the armature 33 to input light into the light mixing guide 132. Each light source segment 96 has a radial component with respect to the centroid of the light mixing guide 132 so as to conform to the corresponding light input edge 140. The distance between each light source segment 96 and its corresponding light input edge 140 is defined, as discussed in greater detail above. Portions of an edge 142 of the light mixing guide 132 that extends between the radially inward edge of each light input edge 140 and the radially-outward edge of the adjacent light input edge 140 contacts the armature 33 to establish the defined relationship between the light segments 96 and their respective light input edges 140.

Figure 29:
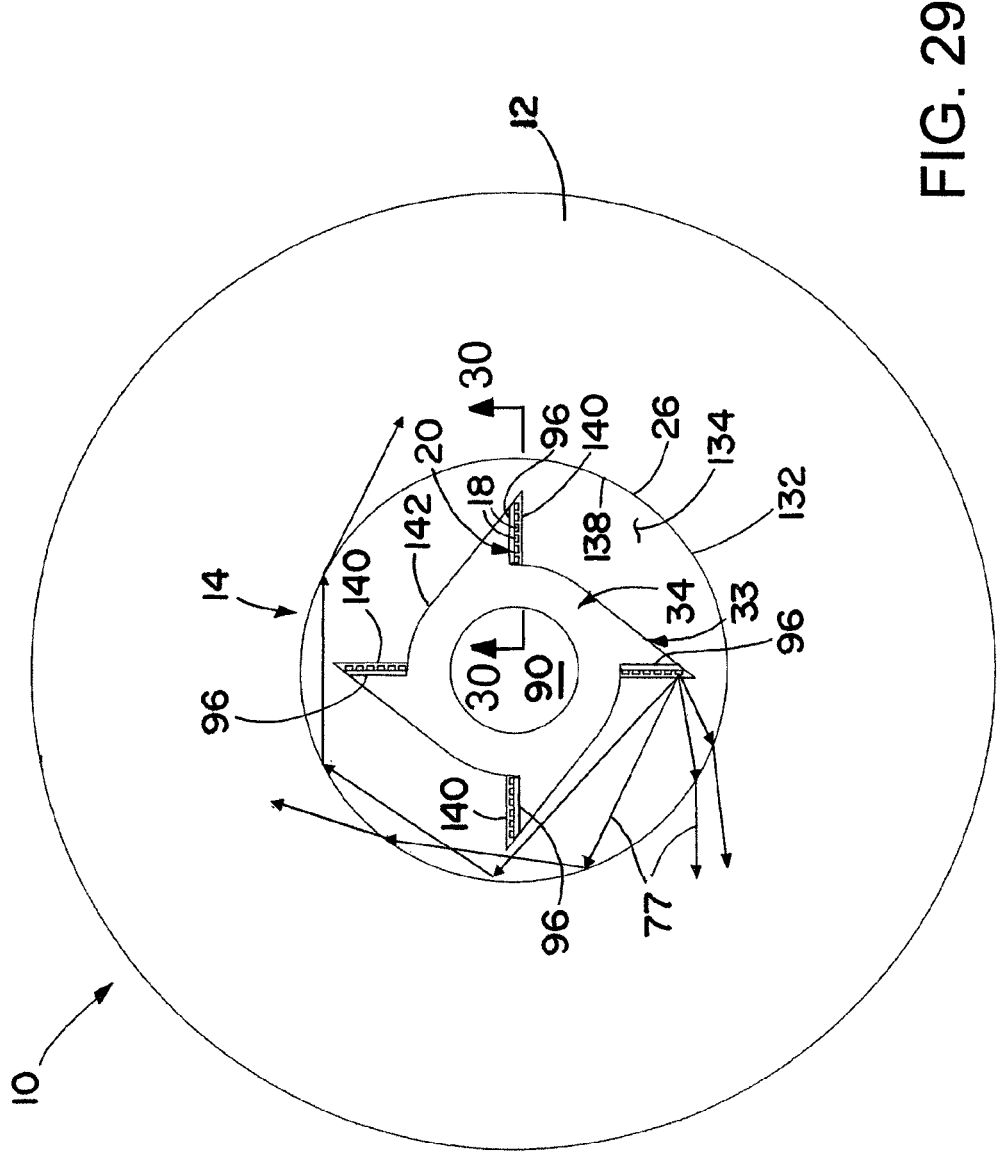
FIG. 29 is a schematic view of another exemplary lighting assembly with a cover of a light engine removed.

Exemplary light rays 77 from one light source 18 are illustrated in FIG. 29. Components of the light rays 77 in the plane of the drawing are illustrated. However, the light rays 77 can also include out-of-plane components that propagate by total internal reflection in the light mixing guide 132 and the light guide 12.

Light output by the light source segments 96 is input into the light mixing guide 132 through the corresponding light input edge 140. The light then travels through the light mixing guide 132 until it becomes incident on the light output edge 138. Light incident on the light output edge 138 at an angle less than the critical angle for total internal reflection at the light output edge 138 exits the light mixing guide 132 through the light output edge 138. The light input edge 26 of the light guide 12 is adjacent and conforms to the light output edge 138 of the light mixing guide 132, but is separated from the light output edge 138 so that the light guide 12 does not disrupt total internal reflection at the light output edge 138. The light exiting the light output edge 138 enters the light guide 12 through the light input edge 26. Also, light incident on the light output edge 138 at an angle greater than the critical angle reflects off the light output edge 138 toward another point on the light output edge 138, where it may exit the light mixing guide 132 or reflect again by total internal reflection, depending on the angle of incidence.

In the illustrated embodiments, the light output edge 138 is circular. In other embodiments, the light output edge 138 is of another shape, such as an oval or a semicircle.

Figure 31:
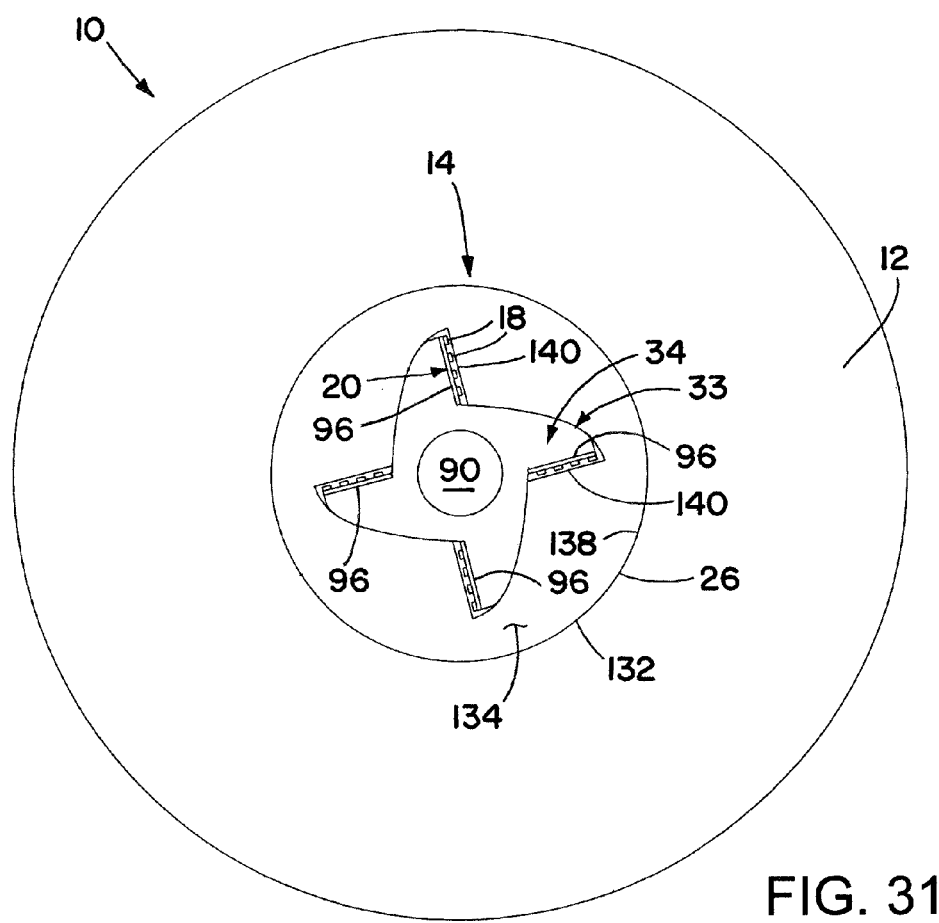
FIG. 31 is a schematic view of another exemplary lighting assembly with the cover of the light engine removed.
Figure 32:
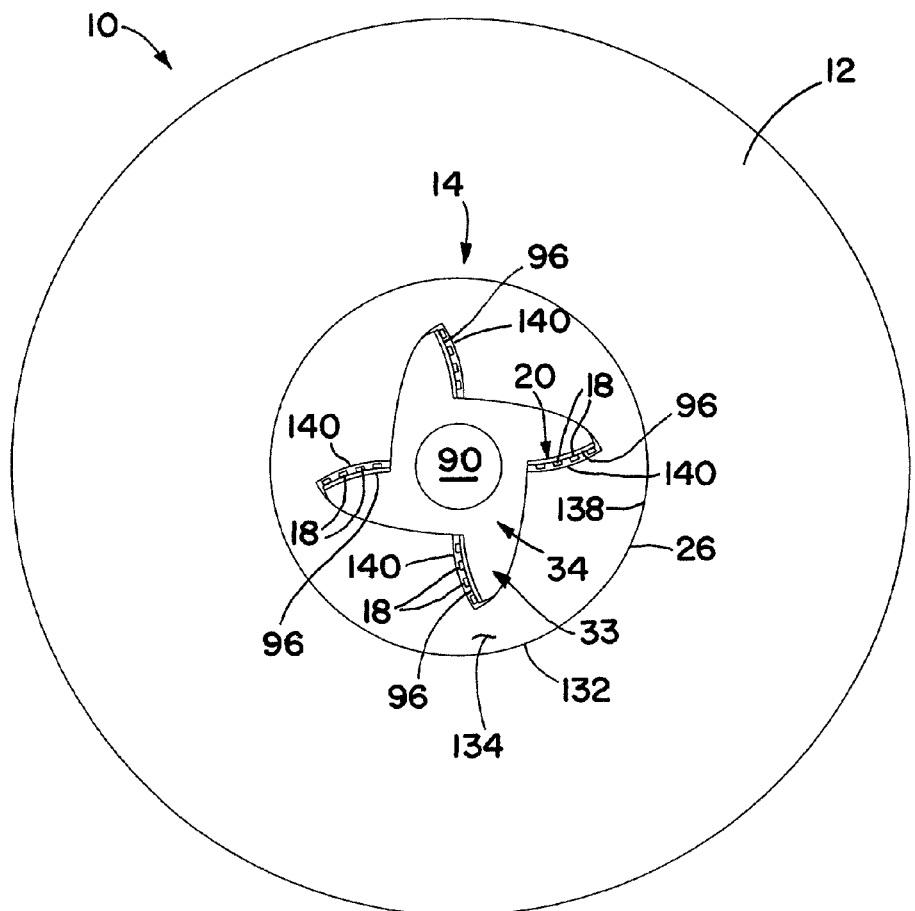
FIG. 32 is a schematic view of another exemplary lighting assembly with the cover of the light engine removed.

The light sources 18 of each light source segment 96 are spaced apart from each other in a direction having a radial component extending from a centroid of the light mixing guide 132. In one embodiment, such as that of FIG. 29, the light source segments 96 and the corresponding light input edges 140 are straight. Also, in the embodiment of FIG. 29, the light source segments 96 extend radially from the centroid. In other embodiments, such as those of FIGS. 31 and 32, the light sources 18 of each light source segment 96 also are spaced apart from each other in a circumferential direction about the centroid. In the embodiment of FIG. 31, the light source segments 96 each extend along a straight line that does not pass through the centroid. In the embodiment of FIG. 32, the light source segments 96 are curved and the corresponding light input edges 140 conform to the curvature of the light source segments.

To maximize light propagation from the light input edges 140 to the light output edge 138, the light mixing guide 132 does not have light-extracting deformities on the major surfaces 134, 136 that would extract light from one or both of the major surfaces 134, 136. To further maximize directing of light from the light sources 18 to the light output edge 138, the lighting assembly 10 includes a first reflector 144 (FIG. 30) adjacent the light source segments 96 and the first major surface 134 and a second reflector 146 (FIG. 30) adjacent the light source segments 96 and the second major surface 136. In other embodiments, the inner surfaces of the cover 36 and the mounting unit 34 are reflective. In one embodiment, the reflectors 144, 146 are further located adjacent the interface of the light output edge 138 of the light mixing guide 132 and the light input edge 26 of the light guide 12.

Figure 30:
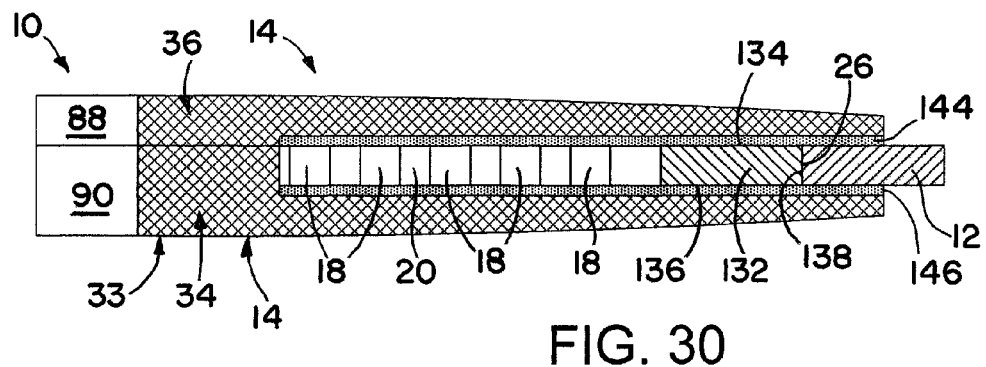
FIG. 30 is a cross-sectional view of the lighting assembly of FIG. 29 taken along the line 30-30 of FIG. 29, but with the cover included.

As best illustrated in FIG. 30, the armature 33 mechanically supports and retains the light mixing guide 132 and the light guide 12. For instance, in the illustrated embodiment, the cover 36 is secured to the mounting unit 34 (e.g., in any of the manners described above), and each of the light mixing guide 132 and the light guide 12 are disposed between and retained by the cover 36 and the mounting unit 34.

In one embodiment, the light mixing guide 132 and the light sources 18 are cooperatively configured so that the light output through the light output edge 138 is uniform in intensity along the light output edge 138. In this manner, the light input into the light input edge 26 of the light guide 12 is uniform in intensity along the light input edge 26 of the light guide 12. To enhance the uniformity, light-extracting optical elements may be strategically placed at the light output edge 138 of the light mixing guide 132. Additionally or alternatively, the uniformity of the light exiting the light mixing guide 132 into the light guide 12 may be controlled by interposing a reflector with a transmittance that depends on circumferential position relative to the light input edges 140 between the light mixing guide 132 and the light guide 12.

Figure 33:
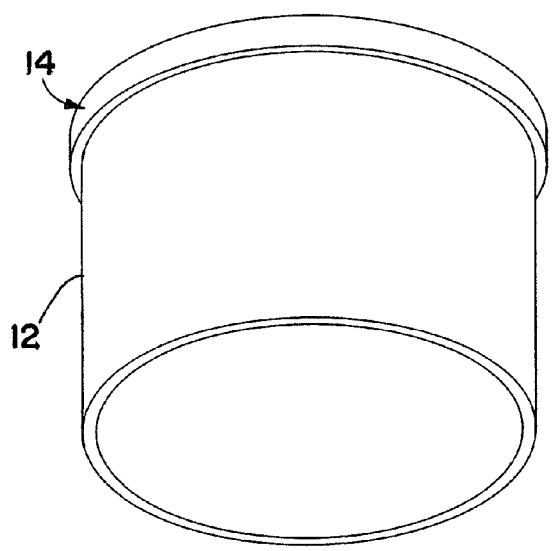
FIG. 33 is a perspective view showing an example of a lighting assembly having a cylindrical light guide and a cylindrical light engine.

In the examples described above with reference to FIGS. 1-12, the light guide 12 is planar and the light input edge 26 is straight. In other examples, the light guide 12 is curved about an axis orthogonal to the intersection of the light input edge 26 and one of the major surfaces 22, 24, and may even be cylindrical. In such embodiments, the light engine 14 is configured to conform to the light input edge 26. FIG. 33 shows an example in which the light guide 12 is cylindrical, and the light engine 14 is also cylindrical to conform to the circular shape of the light input surface 26 (not shown in FIG. 33, but see FIG. 1) of the light guide. Fins are omitted from the light engine 14 of FIG. 33 to simplify the drawing.

In this disclosure, the phrase "one of" followed by a list is intended to mean the elements of the list in the alterative. For example, "one of A, B and C" means A or B or C. The phrase "at least one of" followed by a list is intended to mean one or more of the elements of the list in the alterative. For example, "at least one of A, B and C" means A or B or C or (A and B) or (A and C) or (B and C) or (A and B and C).

What is claimed is:

1. A lighting assembly, comprising:
   a light guide comprising opposed major surfaces between which light propagates by total internal reflection, and a light input edge;
   a light engine comprising:
      a heat conductive armature comprising a receptacle for a portion of the light guide that includes the light input edge, a portion of the armature that forms the receptacle comprising a mounting unit and a cover to form the receptacle; and
      a light source retained by and thermally coupled to the armature, the armature functioning as a heat sink for dissipating heat generated by the light source;
   wherein the light guide is mechanically retained in the receptacle, the light guide being disposed between the cover and the mounting unit, and the light guide and the armature cooperate to align the light input edge with the light source for inputting light from the light source into the light guide through the light input edge.

2. The lighting assembly of claim 1, wherein one of the light guide and the armature includes positioning elements that engage the other of the light guide and the armature to position the light input edge at a defined distance from the light source.

3. The lighting assembly of claim 2, wherein the positioning elements are further configured to align the light input edge with the light source in a direction parallel to the light input edge and to the major surfaces.

4. The lighting assembly of claim 2, wherein the defined distance places the light source in contact with the light input edge.

5. The lighting assembly of claim 1, wherein the armature defines one or more airflow pathways between the light guide and the armature.

6. The lighting assembly of claim 1, wherein a portion of the armature that forms the receptacle is monolithic.

7. The lighting assembly of claim 1, wherein the light guide further comprises light-extracting elements at at least one of the major surfaces of the light guide to extract light from the light guide through at least one of the major surfaces.

8. The lighting assembly of claim 1, wherein the armature comprises a frame adjacent an edge of the light guide other than the light input edge.

9. The lighting assembly of claim 1, wherein the light input edge is an exterior edge of the light guide.

10. The lighting assembly of claim 1, wherein the light guide surrounds the light engine.

11. The lighting assembly of claim 1, wherein the light engine comprises a base to which the light source is mounted, and the base is retained by the armature.

12. The lighting assembly of claim 11, wherein the base is moveable with respect to the armature between a retracted position in which the light source and the light input edge are spaced apart by a first distance and a light input position in which the light source and the light input edge are spaced apart by a second distance smaller than the first distance.

13. The lighting assembly of claim 1, wherein a height of the receptacle is the same as or greater than a thickness of the light guide and a width of the receptacle is the same as or greater than a width of the light guide.

14. The lighting assembly of claim 1, wherein a reflector is located between the light guide and the mounting unit.

15. The lighting assembly of claim 1, wherein a reflector is located between the light guide and the cover.

* * * * *